United States Patent [19]

Sallas et al.

[11] Patent Number: 4,670,863
[45] Date of Patent: Jun. 2, 1987

[54] VIBRATOR SEISMIC SOURCE HAVING ADAPTIVE DISTORTION LIMITING CONTROL SYSTEM

[75] Inventors: John J. Sallas, Plano; Toby R. Trevino, Garland, both of Tex.

[73] Assignee: Texas Instruments Incorporated, Dallas, Tex.

[21] Appl. No.: 799,883

[22] Filed: Nov. 20, 1985

[51] Int. Cl.[4] ............................................. H04R 23/00
[52] U.S. Cl. .................................. 367/190; 181/121; 367/189
[58] Field of Search ................ 367/189, 190; 181/113, 181/114, 121; 324/83 FE

[56] References Cited

U.S. PATENT DOCUMENTS

| | | | |
|---|---|---|---|
| 3,854,118 | 12/1974 | Pelton | 340/17 |
| 3,895,343 | 7/1975 | Farr | 367/190 |
| 3,979,715 | 9/1976 | Hufstedler et al. | 340/15.5 |
| 4,056,163 | 11/1977 | Wood et al. | 181/113 |

OTHER PUBLICATIONS

"Vibratory Surface Sources" Seriff et al, Geophysics, vol. 35 #2, pp. 234–246, 1970.

Primary Examiner—Charles T. Jordan
Assistant Examiner—John W. Eldred
Attorney, Agent, or Firm—Thomas G. Devine; Leo N. Heiting; Melvin Sharp

[57] ABSTRACT

A vibrator seismic source has a sweep generator for providing a pilot signal and sensors for generating a feedback signal representative of the force imparted to the ground by the vibrator pad. Circuitry is incorporated for separating the fundamental signal from the feedback signal and for separating the distortion from the feedback signal. Means are provided for generating a control signal for controlling the action of the vibrator means. Included are means for reducing the amplitude of the pilot signal a designated amount, determined by the distortion, and means for algebraically summing the reduced amplitude pilot signal and the fundamental signal to provide an error signal. The error signal is input to a loop filter to perform real time correction of the control signal. The reduced amplitude pilot signal is input to means for adjusting the control signal for trends in the distortion. Additionally, the control system employs a phase detector circuit that outputs any phase difference between the feedback and pilot signals. The phase difference is applied to the control signal to shift the feedback signal phase to correspond to the pilot signal.

30 Claims, 32 Drawing Figures

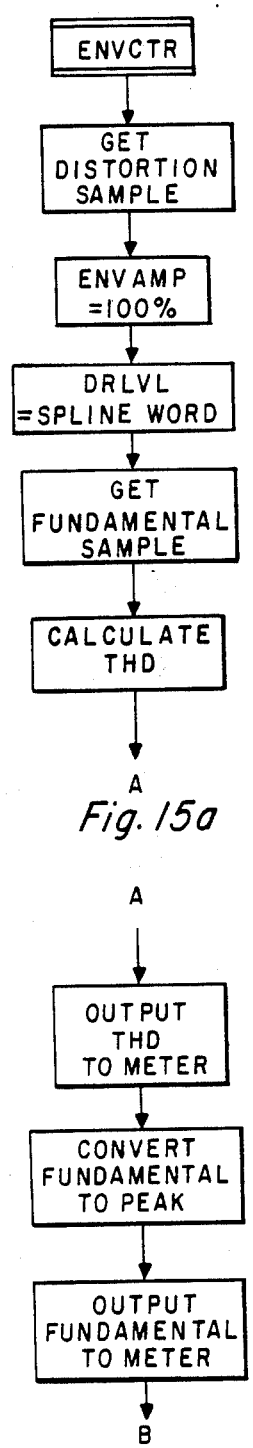
Fig. 15a
Fig. 15b
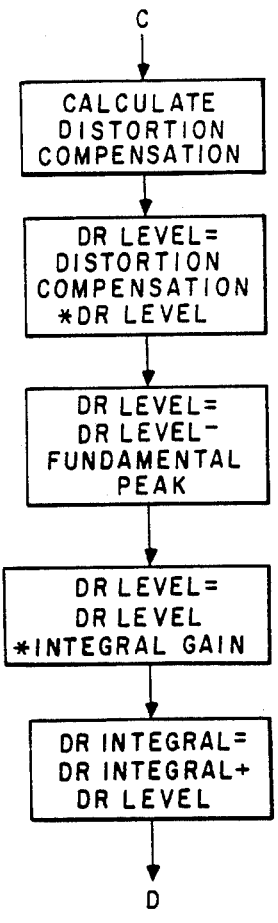
Fig. 15d

VIBRATOR SEISMIC SOURCE HAVING ADAPTIVE DISTORTION LIMITING CONTROL SYSTEM

BACKGROUND OF THE INVENTION

1. Field of the Invention

This invention relates to vibrator seismic sources having feedback control, and more specifically to seismic sources having feedback control in which the fundamental signal in the feedback is compared with the pilot signal and the control signal adjusted accordingly, and in which the distortion in the feedback signal reduces the amplitude of the pilot signal and the control signal is reduced accordingly.

2. Description of the Prior Art

Prior art vibrators detect phase differences between the vibrator motion and a pilot signal. The phase of the control signal for controlling the vibrator is shifted in phase to coincide with that of the pilot signal.

In more recent times, vibrator seismic sources have included means for examining amplitude as well as phase. In these prior art systems, the drive signal is increased in amplitude to increase fundamental acoustic energy. However, often the system is driven further into a nonlinear region. Furthermore, there is an accompanying increase in the harmonic distortion. Systems which compare peak amplitude of the feedback signal to the pilot signal, or which monitor force to determine when a decoupling of the pad from the ground is imminent do not take into account the distorton present in the force imparted to the ground.

In U.S. Pat. No. 4,616,352, issued on Oct. 7, 1986 entitled "Vibrator Seismic Source Having Distortion Limiting Control System" and assigned to the assignee of this invention, the component parts of the force applied to the ground are treated. That is, the fundamental signal and the real time distortion are separately treated rather than depending upon the entire signal itself. By so doing, the real time distortion is not inadvertently increased by increasing the drive to the vibrator and any increase or decrease in drive, when distortion is not a significant factor, is closely controlled because of the use of the fundamental signal.

The present invention also deals with treating the component parts of the force applied to the ground. However, in a typical survey, the composition of the ground may change dramatically. This invention treats trends in distortion as well as the real time distortion to allow for the change in composition of the ground.

BRIEF SUMMARY OF THE INVENTION

A seismic vibrator source has a sweep generator for providing a pilot signal and a sensor arrangement for detecting the force imparted to the ground by the vibrator. The sensor arrangement provides a feedback signal representative of the ground force, such signal containing a fundamental signal and accompanying distortion.

Miller and Pursey, in a paper entitled "Field and Radiation Impedance of Mechanical Radiators on the Free Surface of a Semi-Infinite Isotropic Solid", dated November, 1953, disclosed the finding that surface stress introduced at the surface of a homogenous body is related to far field particle motion. That is, a force applied to the surface is directly related to far field motion. Therefore, presence of distorton in the total ground force signal indicates that distortion is being radiated into the earth along with the fundamental signal. Hence, with an introduction to the surface of only the fundamental signal, seismic probing is enhanced.

This invention provides a mechanism for removing the real time distortion, the distorton trend, and the fundamental signal from the ground force signal. In this preferred embodiment, a pair of accelerometers, one attached to the mass of the vibrator and the other to the pad, have their outputs combined to form a feedback signal representative of the ground force. Ideally, this force is the fundamental signal only. In practice, there is harmonic distortion present along with the fundamental. In this preferred embodiment, apparatus is provided for removing the fundamental, changing it into an analog value representative of the root means square (RMS) value of the fundamental signal, digitizing and entering it into an amplitude compensator system in a digital computer. The feedback signal, containing both the fundamental signal and the harmonic distortion is passed through a notch filter. The notch frequency is set to the fundamental frequency by a digital computer. The output of the notch is the harmonic distortion present in the total feedback signal. The harmonic distortion is converted to its RMS value, digitized and sent to the amplitude compensator. The amplitude compensator, by dividing the RMS harmonic distortion by the square root of the sum of squares of the RMS harmonic distortion and RMS fundamental, provides the real time total harmonic distortion (THD). A sweep generator, including a digital envelope generator and analog circuitry, provides a variable sweep with a variable amplitude. The output of the envelope generator, the pilot signal, is combined with the fundamental digital representation to provide an increased or decreased digital indication of a control signal. Also, a representation of the real time distortion is subtracted from the pilot signal. The trend in distortion, by taking a plurality of samples, each from previous sweeps is used to select a scale factor on subsequent sweeps to reduce the amplitude of the pilot signal. This reduced amplitude pilot signal is multiplied by a historical gain factor for a given frequency to provide an output which is combined with an error signal resulting from the difference between the amplitude of the fundamental signal and the reduced amplitude pilot signal, as further reduced by the real time distortion, to provide a control signal. The digital control signal is synthesized into an analog wave that is utilized in the system to produce a drive signal appropriately altered to provide a ground force with minimum harmonic distortion.

The system also includes phase compensation, with the preferred embodiment being fully described and claimed in copending patent application Ser. No. 435,125, entitled "Seismic Vibrator Source Having Improved Phase Detector", filed Oct. 18, 1982.

An object of the invention is to compare the fundamental frequency component of the feedback signal of a seismic vibrator source with a pilot signal to determine drive signal amplitude.

Another object of the invention is to subtract the real time distortion from the algebraic sum of the fundamental and pilot signals of a seismic vibrator source.

Still another object of this invention is to reduce the amplitude of the pilot signal by a signal representing a trend in the distortion.

These and other objects will be made evident in the detailed description that follows.

DETAILED DESCRIPTION

Figure 1:
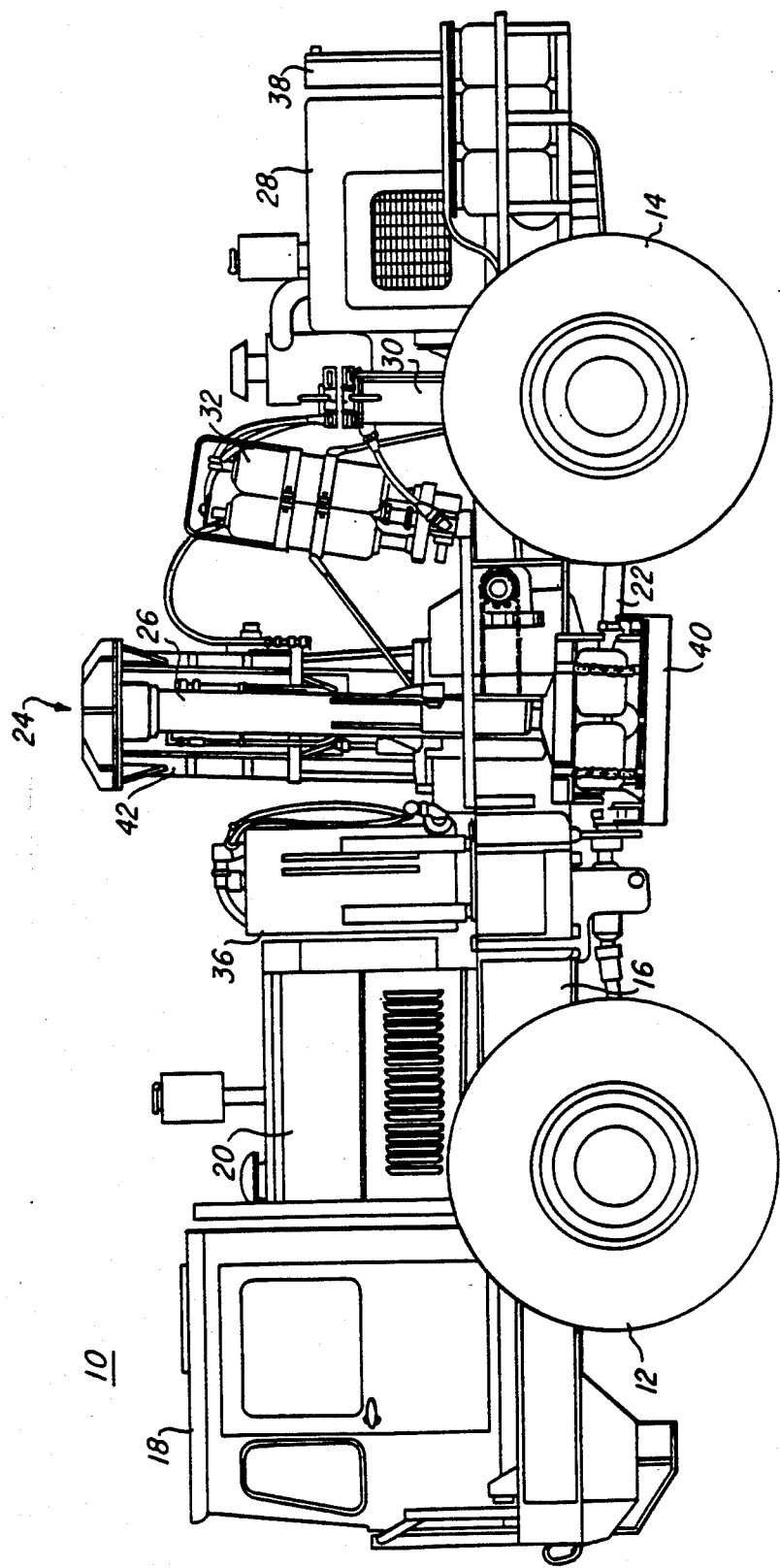
FIG. 1 is a side view of the seismic vibrator source mounted on a truck.

Referring first to FIG. 1, a vehicle 10 having front and rear wheels 12 and 14, respectively, supports a chassis comprised generally of frame channels 16, a cab 18, and a converntiona engine 20. The feedback circuit of this invention is primarily located within cab 18 and is not shown in FIG. 1. Vibrator assembly 24 is disposed between the front and rear wheels and connected to the frame members 16 of the truck by a lift system 26. A prime mover or engine 28, main hydraulic pump 30, high pressure accumulator system 32, hydraulic fluid tank 36, hydraulic tank cooler 38 and associated hydraulic plumbing may be located on the frame members 16 as shown.

Figure 2:
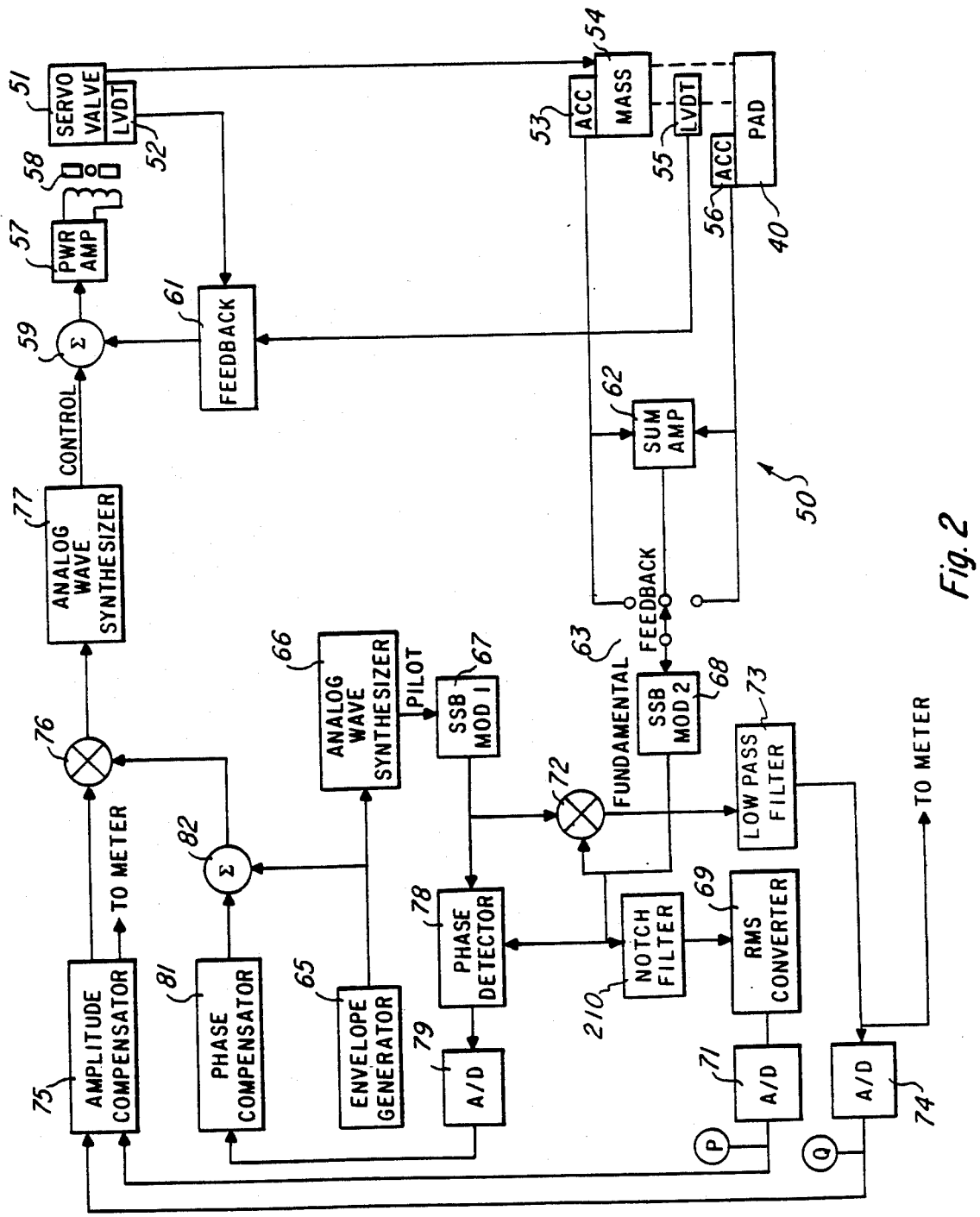
FIG. 2 is a block diagram of the feedback system.

FIG. 2 illustrates the combination of summer 59, power amplifier 57, servo valve motor 58, servo valve 51, mass 54, pad 40, linear variable-differential transducers 52 and 55, and feedback 61. This combination is in the prior art as described in U.S. Pat. No. 3,929,206, entitled "Servo Hydraulic Transducer and Method of Operation" assigned to the assignee of this invention and incorporated herein by reference. Accelerometers 53 and 56 are attached to the mass 54 and pad 40 respectively and are summed in conventional summing amplifier 62. Switch 63 enables the selection of the mass accelerometer output, the pad accelerometer output, or the addition of the two outputs. Any of these three signals then form the feedback signal which passes into single sideband (MOD 2) 68, the output of unit 68 being a single sideband signal increased by the frequency of a local oscillator, which in this preferred embodiment operates at 2 KHz. The output from unit 68 goes to multipler 72 and to phase detector 78.

Amplitude compensator 75, phase compensator 81 and envelope generator 65 are modules within a TI 99000 microprocessor chip which, together with appropriate memory, form a microcomputer. The envelope generator 65 provides digital words indicative of the contour of the desired amplitude envelope. Also provided by the computer is a digital word relating to instantaneous frequency. The output of the envelope generator 65 provides inputs to analog wave synthesizer 66. Analog wave synthesizer 66 is known in the prior art and is described in detail in U.S. Pat. No. 3,979,715, entitled "Method and System for Achieving Vibrator Phase Lock", assigned to the assignee of this invention and incorporated herein by reference. There it is shown that the analog wave synthesizer comprises a binary rate multiplier, binary counters, a read-only memory, and a D to A converter. The output of analog wave synthesizer 66 is the pilot signal which enters single sideband (MOD 1) 67 and is increased in frequency by 2 KHz, in this preferred embodiment. The output of unit 67 provides an input to phase detector 78 and an input to multiplier 72. The multiplication of the feedback single sideband signal by the single sideband pilot signal yields a heterodyned signal. The heterodyned signal is input to a low pass filter 73 which provides a voltage level indicative of the product of the RMS value of the input fundamental signal and the cosine of the phase difference between the SSB pilot and SSB feedback. RMS converter 69, in this preferred embodiment, is type AD536ASD/883B, manufactured by Analog Devices. The output from low pass filter 73 is input to A/D converter 74 whose output goes to amplitude compensator 75. The output from unit 68 provides an input to RMS converter 69 whose output represents the RMS value of the feedback signal which is then digitized through A/D converter 71 and input to amplitude compensator 75. Amplitude compensator 75 provides an input to multiplier 76 whose other input comes from envelope generator 65 through summer 82. Amplitude compensator 75, as will be shon, provides a digital output altering the output of envelope generator 65 to provide an amplitude digital indicator representing the pilot signal modified by the amplitude of the fundamental signal and by the distortion. This digitial information is presented to analog wave synthesizer 77 which is in the prior art and substantially identical to analog wave synthesizer 66 to provide a control signal through summer 59 to power amplifier 57 which provides a drive signal for driving the servo valve 51 to move the hydraulic unit, mass 54 and pad 40 so that the feedback signal is equal in amplitude to the pilot signal. This broad description is of the amplitude compensation and following is a broad description of the phase compensation.

Phase detector 78 having inputs from units 67 and 68 provides a phase difference output to phase compensator 81 through A to D converter 79. The output of phase compensator 81 is summed with a digital word, indicative of an instantaneous frequency from envelope generator 65, at summer 82. A frequency change, if any, is reflected through the analog wave synthesizer 77 to provide the control signal for ultimately providng a feedback signal in phase with the pilot signal.

Figure 3:
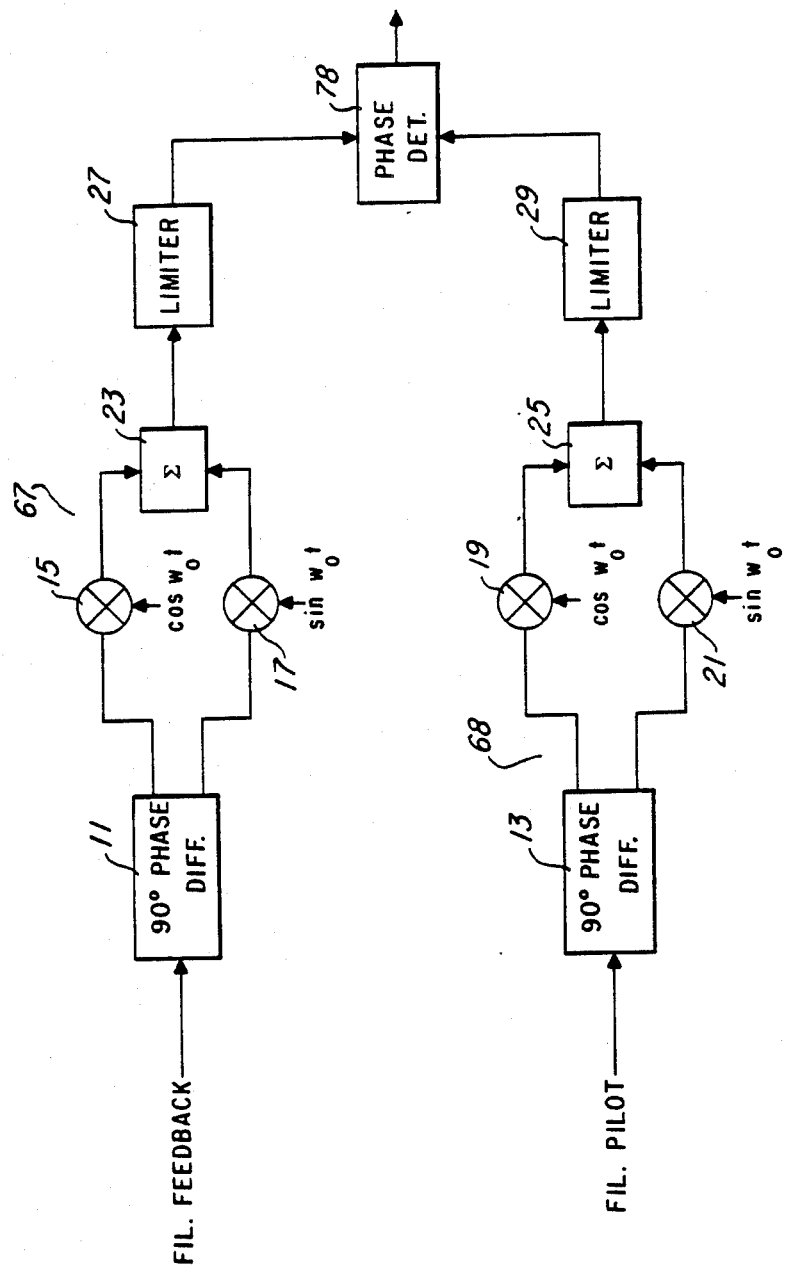
FIG. 3 is a simplified diagram illustrating the single sideband shifting circuitry.

FIG. 3 shows a filtered feedback signal and a filtered pilot signal entering units 67 and 68, respectively. Since the units are identical, the detailed description will relate to the pilot signal for this figure and following figures, with it being understood that the circuitry, unless otherwise specified, is identical for the feedback signal.

The filtered pilot signal enters 90 degrees phase differential unit 13 having a cosine output which is multiplied at 19 by cosine $W_o t$, a signal from a local oscillator to be described later. A sine wave from unit 13 is multiplied at 21 by the sine $W_o t$ which is summed at 25 with the product from multiplier 19, providing a single output to limiter 29 for squaring the output to phase detector 78. The feedback signal is treated in the same fashion and also inputs phase detector 78.

Figure 4A:
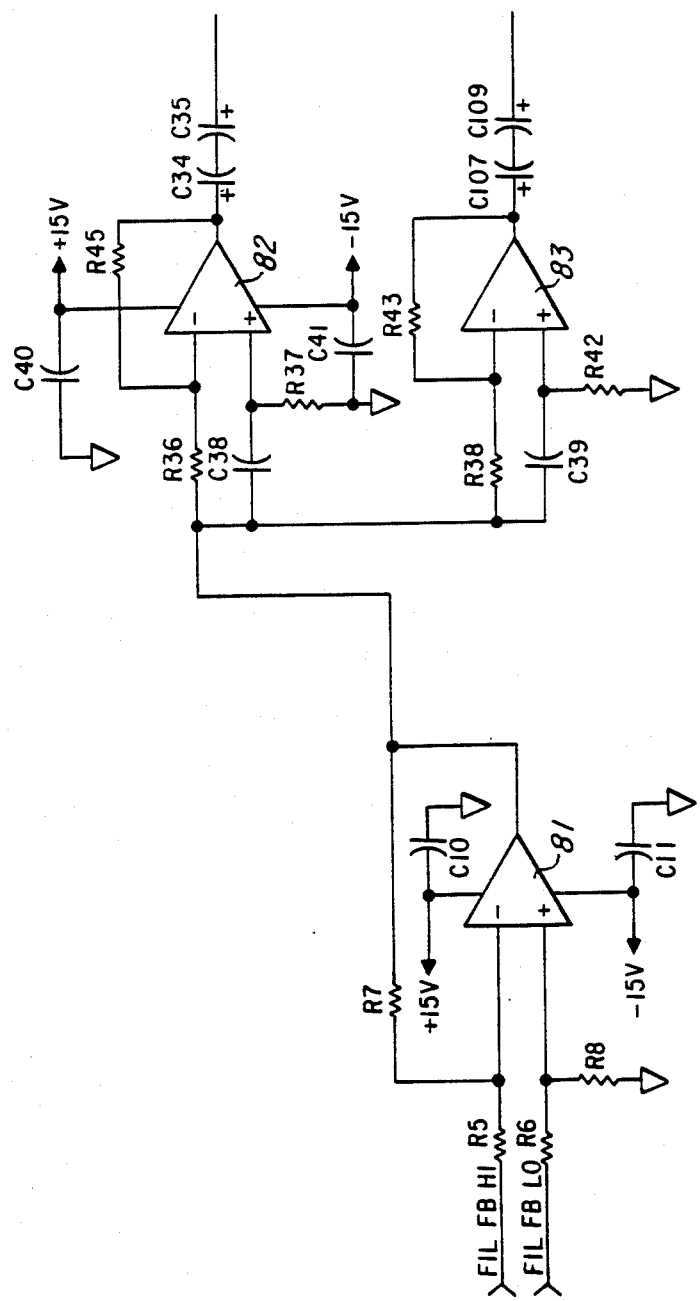
FIGS. 4a and 4b together schematically illustrate a portion of the single sideband shift network for the feedback signal.
Figure 4B:
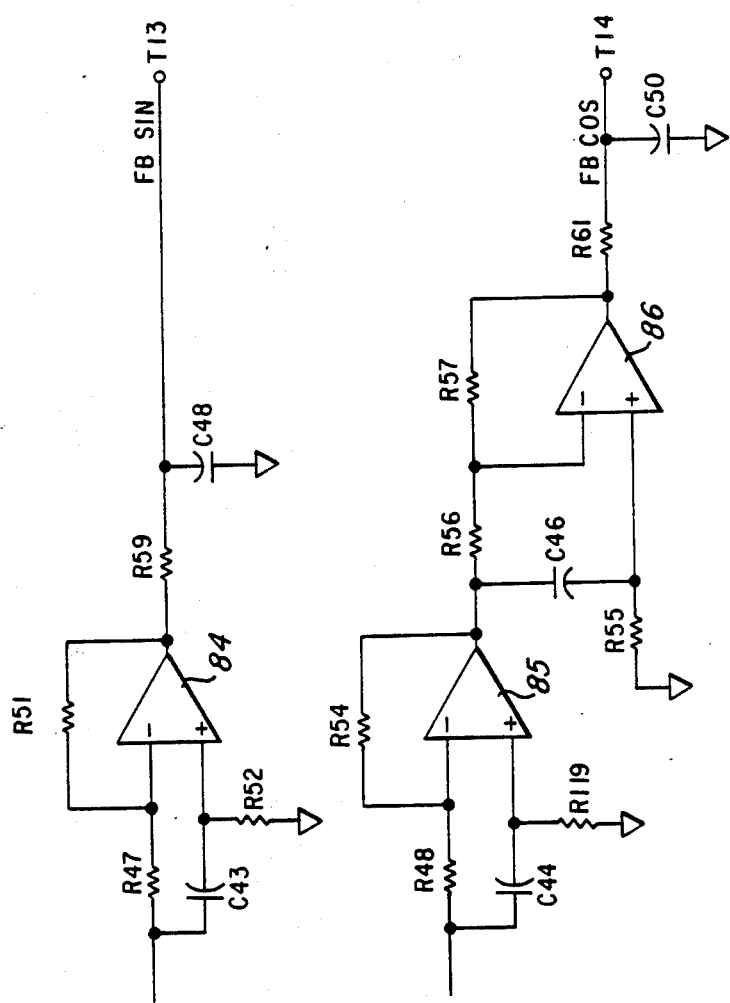

FIGS. 4a and 4b, joined as shown, schematically illustrate the 90 degree phase differential unit 11 for the feedback signal.

Figure 5A:
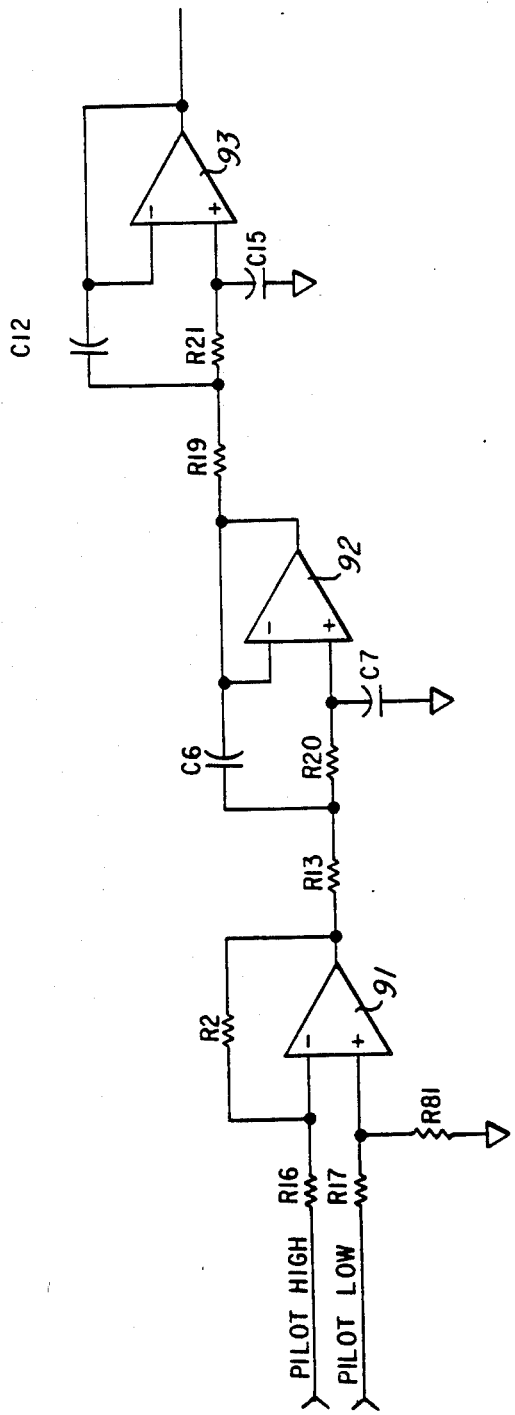
FIGS. 5a and 5b schematically illustrate a portion of the single sideband shift circuitry for the pilot signal.
Figure 5B:
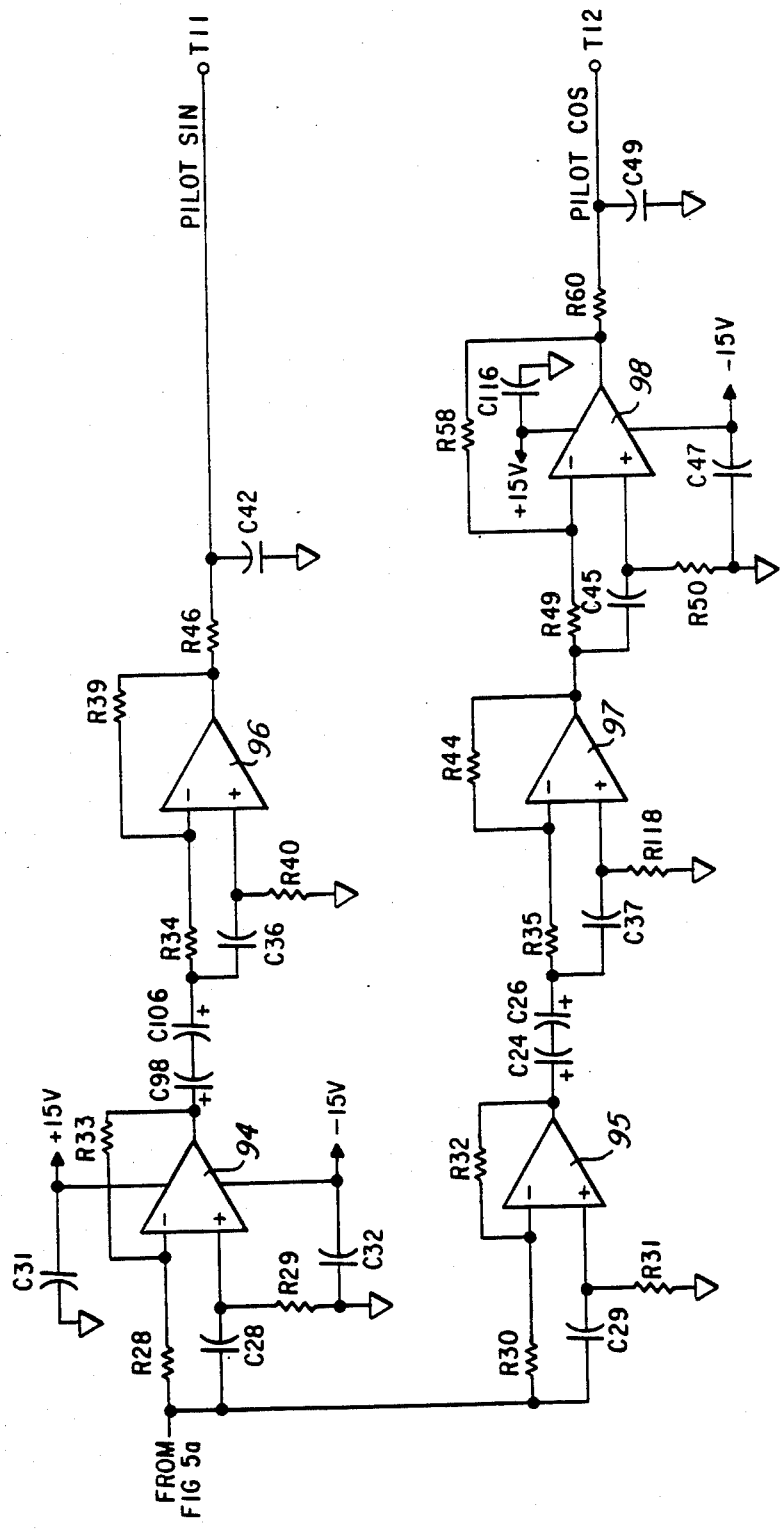

FIGS. 5a and 5b, joined as shown, schematically illustrate the 90 degree phase differential unit 13 for the pilot signal. Pilot high and pilot low signals are shown connected to the negative and positive terminals of operational amplifier 91, respectively. In this preferred embodiment, a dual signal, such as pilot high and pilot low, is employed when moving from one location to another as, for example, from one chip to another. For purposes of transmission, the dual line is used and is single ended by the operation of amplifier 91. Operational amplifier 91 provides an input to a low pass filter made up of operational amplifiers 92 and 93 and the associated components as shown. This low pass filter rolls off at approximately 400 Hz to remove any unwanted harmonic frequencies. It should be noted that in FIGS. 4a and 4b, no such low pass filter is shown. However, such filtering is performed on the feedback signal and is simply not illustrated in these drawings. The filtering is identical to that described for the pilot signal.

The output from operational amplifier 93 provides an input to operational amplifier 94 via resistor R28 and to operational amplifier 95 via resistor R30. The positive input to amplifier 94 is provided by analog ground and impressed through resistor R29. The positive input to amplifier 95 is provided by analog ground impressed through resistor R31. Capacitors C28 and C29 are connected between the utput of amplifier 93 and the positive inputs to amplifiers 94 and 95, respectively. The output of amplifier 94 is connected through series capacitors C98 and C106 and through resistor R34 to the negative terminal of operational amplifier 96. Analog ground is impressed through resistor R40 to the positive terminal of amplifier 96. The output of amplifier 96, through resistor R46, provides the signal "PILOT SIN".

The output of amplifier 95, through series capacitors C24 and C26, and through resistor R35 is impressed on the negative terminal of amplifier 97. Analog ground is provided through resistor R118 to the positive terminal. The output of amplifier 97, through resistor R49, is impressed on the negative input of amplifier 98, whose positive input is grounded through resistor R50. The output of amplifier 98, through resistor R60, provides the signal "PILOT COS". Reference to FIGS. 4a and 4b illustrate the identical circuitry with amplifier 84 providing signal "FB SIN" on terminal T13 and amplifier 86 providing signal "FB COS" on terminal T14. Signal "PILOT SIN" is impressed on terminal T11 and signal "PILOT COS" is impressed on terminal T12.

All of the amplifiers discussed in the above detailed description are type TL084MJ manufactured by Texas Instruments.

FIGS. 6a–6d, joined as shown, illustrate the necessary circuitry for performing the multiplies done by multipliers 15, 17, 19 and 21 of FIG. 3, and the summation of the products. A system clock, from the microcomputer, at approximately 16 MHz, is inverted through inverter 104 and impressed on one input of dual 4-bit binary counter 102, a Texas Instruments type LS393. Output terminal 2Q is connected to the 2CLK terminal of flip-flop 101. The 2Q output of flip flop 101 provides the ICK input to flip flop 105 and the negative input to terminal 1A of dual monostable multivibrator 106.

Four bit up/down synchronous counters 116 and 115 are Texas Instrumnets Type LS169. The RCO terminal of unit 116 is connected to the ENAP terminal of unit 115. The 2Q output of flip flop 105 is signal SIN-/COS which provides the CK input to units 115 and 116 and the A7 cosine or sine select input to memory 118.

Outputs from terminals QA, QB, QC and QD of counter 116 and from terminals QA and QB of counter 115 provide selection inputs to memory terminals A1, A2, A3, A4, A5 and A6, respectively, of memory 118. Sixty four segments of 2 KHz sine and cosine waves are stored in memory 118 and are brought out on terminals D1–D8 to terminals bit 8-bit 1 of multipliers 111 and 119, respectively.

Signals PILOT SIN, PILOT COS, FB SINE and FB COS are brought in on terminals T11–T14, respectively, to terminals S3, S4, S1, and S2 of switch 114, a type AD7512 DIDT/8838 from Analog Devices. FB SIN or FB COSIN is carried on line 201 to terminal VREF of unit 119. PILOT SIN or PILOT COS is carried on line 202 to terminal VREF of unit 111.

Amplifiers 112 and 113, together with unit 111 and associated circuitry, form a four quadrant multiplier and, in this preferred embodiment, is from Analog Devices which provides a D and A conversion and a multiplication to yield the signal "PILOT ANALOG" impressed on terminal T17. Amplifiers 121 and 122, together with unit 119, form an identical D/A-multiplier combination providing signal "FB ANALOG" at terminal T18.

NAND gate 107 has one input, signal SIN-/COS, from the 2Q terminal of flip flop 105 and the other input from terminal 1Q of one-shot 106. The output of one-shot 106 also provides one input to NAND gate 108. The 1Q- output of flip flop 105 is connected to the 1D input to that unit and also provides the other input to NAND gate 108. The outputs of NAND gates 107 and 108 are signals COS HOLD- and SIN HOLD- impressed on terminals T15 and T16, respectively.

Figure 7A:
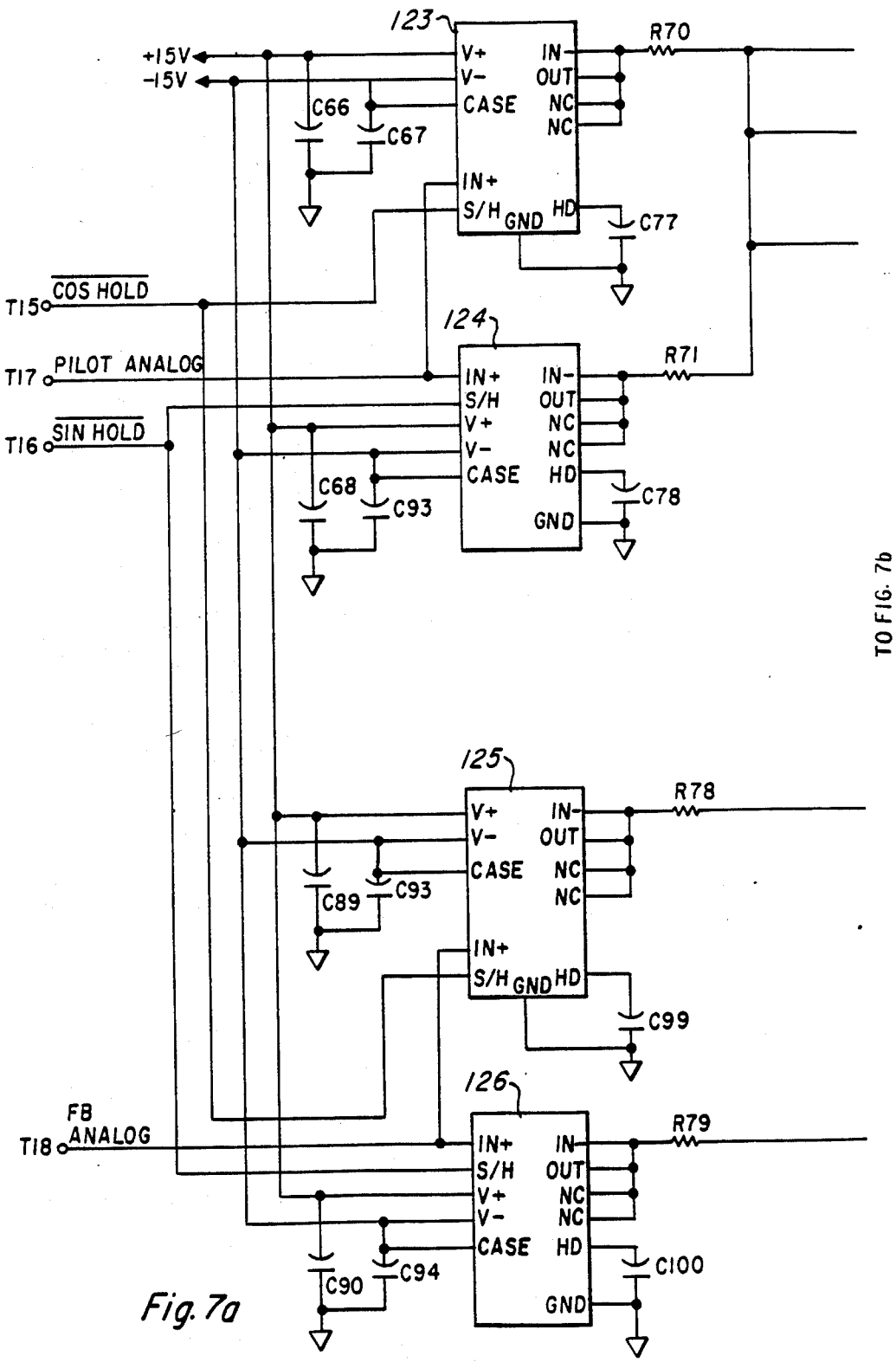
FIGS. 7a–7c, joined as shown, illustrate schematically still another portion of the single sideband shift network.
Figure 7B:
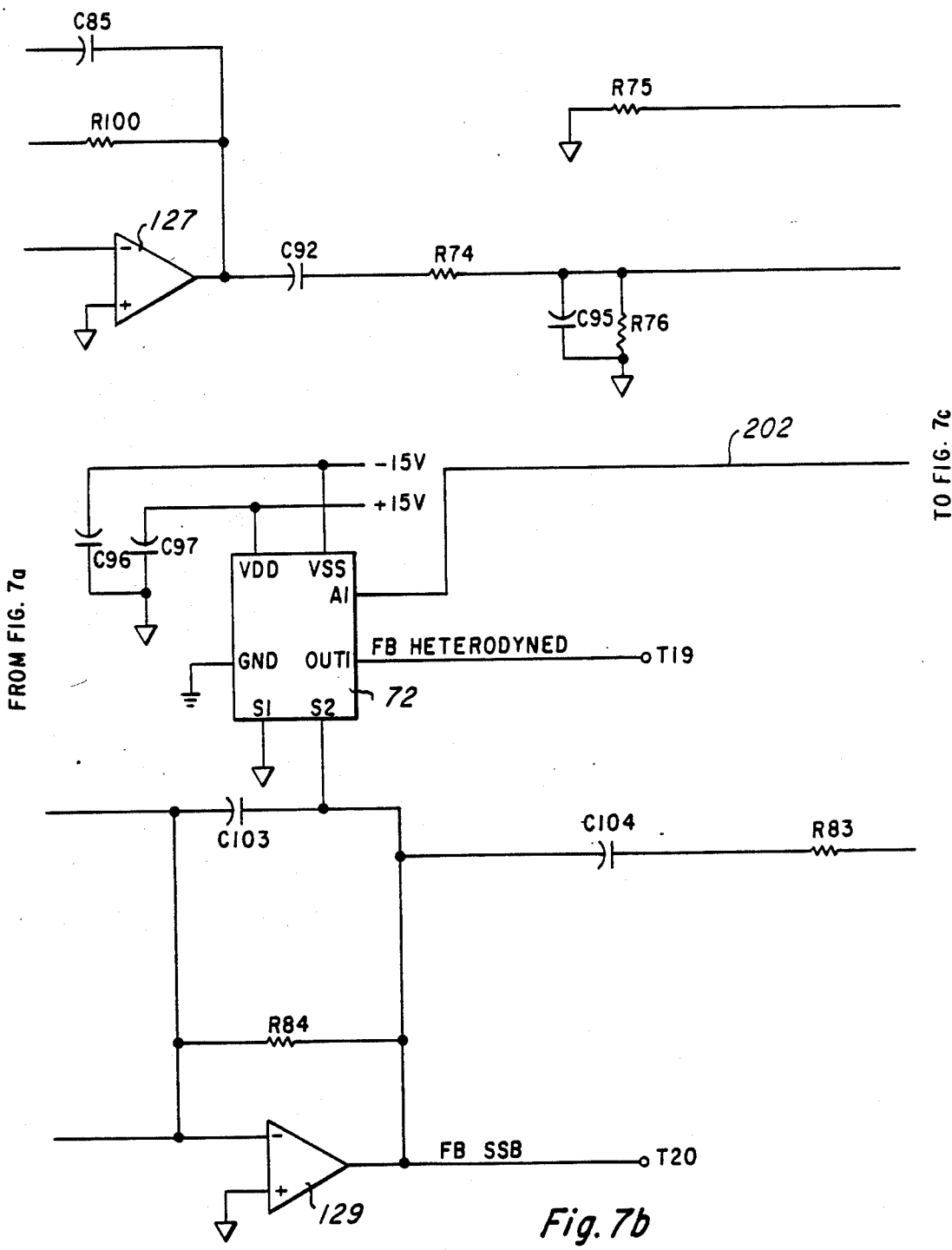
Figure 7C:
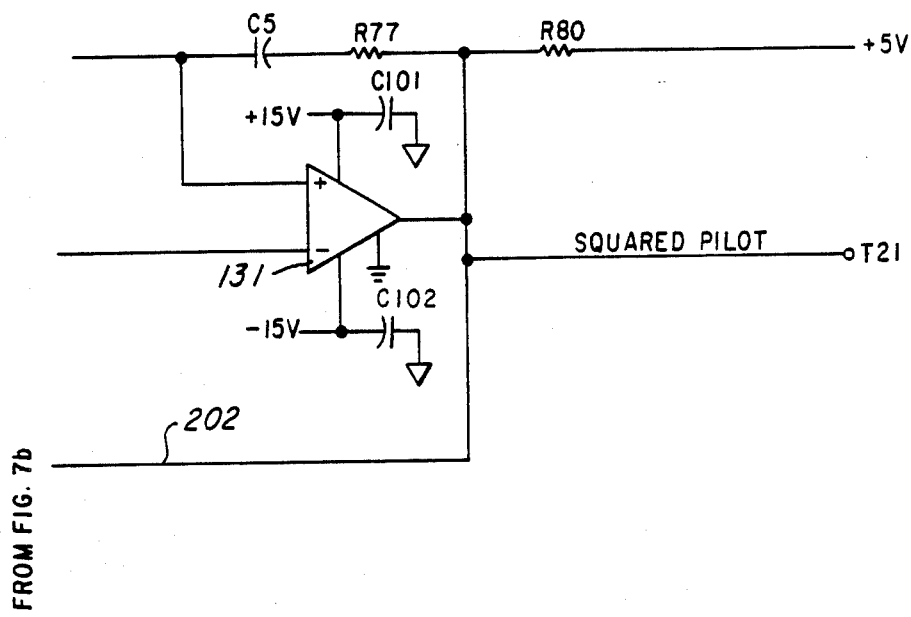
Figure 7C:
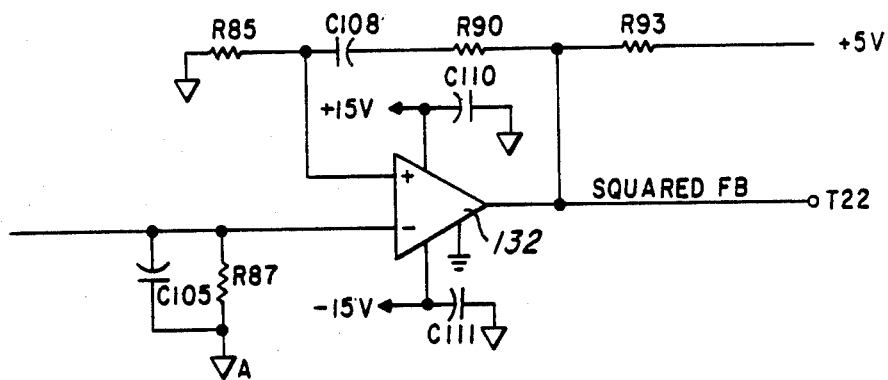

Referring to FIGS. 7a–7c, the input signals COS HOLD is impressed on terminal S/H of each of sample and hold circuits 123 and 125. Signal SIN HOLD- is impressed on the S/H terminal of each sample and hold circuits 124 and 126. These sample and hold circuits, in this preferred embodiment, are type AD583K from Analog Devices.

The pilot analog signal is impressed on the IN+ terminals of units 123 and 124 while the FB analog input is impressed on terminals IN+ of units 125 and 126. The pilot analog signal is gated out of units 123 and 124 by either the COS HOLD- or SIN HOLD- signals to the negative terminal of amplifier 127 whose output, through capacitor C92 and resistor R74, is impressed on the negative input of amplifier 131. The output of amplifier 131, because of its biased positive input, is a squared pilot signal impressed on terminal T21.

The FB analog signal is gated out of units 125 and 126 by either the COS HOLD- or SIN HOLD- signals to the negative terminal or amplifier 129 whose output is signal FB SSB (feedback single sideband) impressed on terminal T20. This signal is also impressed on terminal S2 of analog switch 72 (shown as a multiplier in FIG. 2). The output of amplifier 131 of FIG. 7c is connected to line 202 which provides the input to terminal A1 of analog switch 72. The multiplication of this squared wave with the signal FB SSB yields the signal FB HETERODYNED at terminal T19. The squared pilot and squared FB signals at terminals T21 and T22 are input to the phase detector 78.

Figure 8:
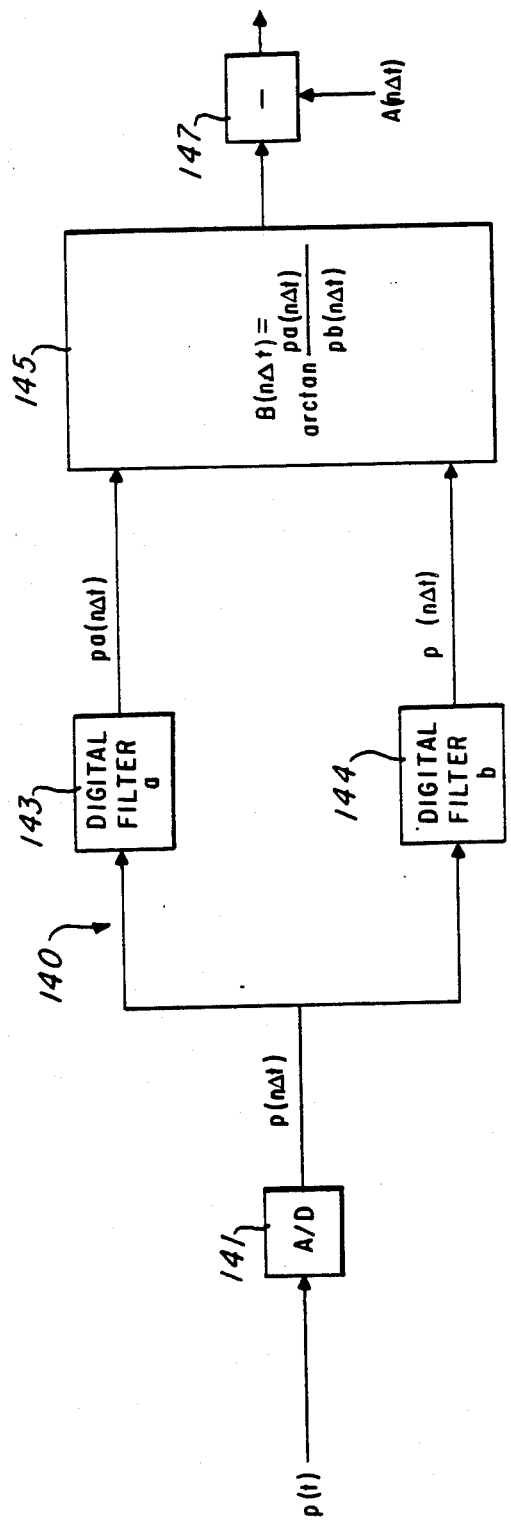
FIG. 8 schematically illustrates a digital alternative for continuous phase detection.

FIG. 8, in block form, illustrates a digital alternative 140 to the preferred embodiment single sideband shift and phase detect technique described above. The pilot signal p(t) is input to A/D converter 141 whose output is signal $P(n\Delta t)$ providing an input to each of digital filters 143 and 144. The output of digital filter 143 is signal $pa(n\Delta t)$ and the output of digital filter 144 is signal $pb(n\Delta t)$, both input to module 45 of the digital computer. As indicated, digital computer 145 calculates phase B $(n\Delta t)$ by computing arctan $pa(n\Delta t)/pb(n\Delta t)$. The difference between phase $B(n\Delta t)$ and A $(n\Delta t)$ (from an identical structure for the feedback signal) are differenced at unit 147, also a part of the computer, to provide a digital representation of phase difference. The digital filters are designed to satisfy the equations:

$$pa(n \Delta t) = \sum_{j=0}^{N} p(n - j) \times Fa(j)$$

$$pb(n \Delta t) = \sum_{j=0}^{N} p(n - j) \times Fb(j)$$

Coefficients Fa(j) and Fb(j) are selected to produce a 90 degree phase difference in the signals pa(n t) and pb(n t).

Figure 9A:
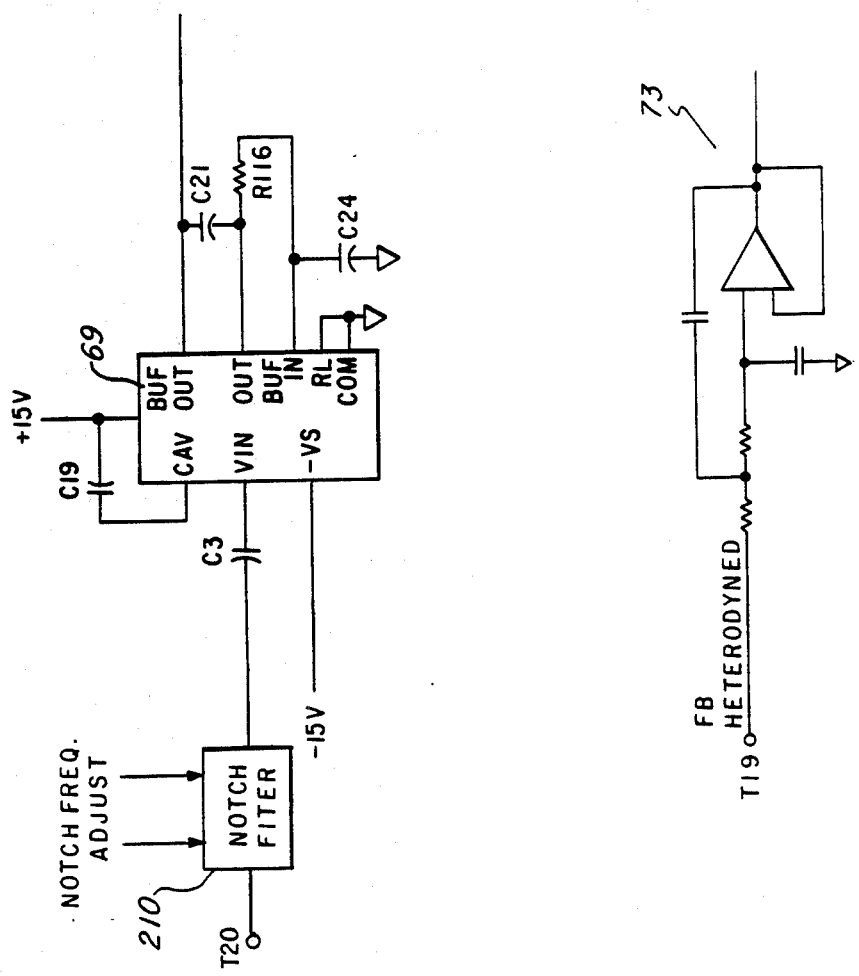
FIGS. 9a and 9b together schematically illustrate development of the distortion RMS and the fundamental RMS voltage levels.
Figure 9B:
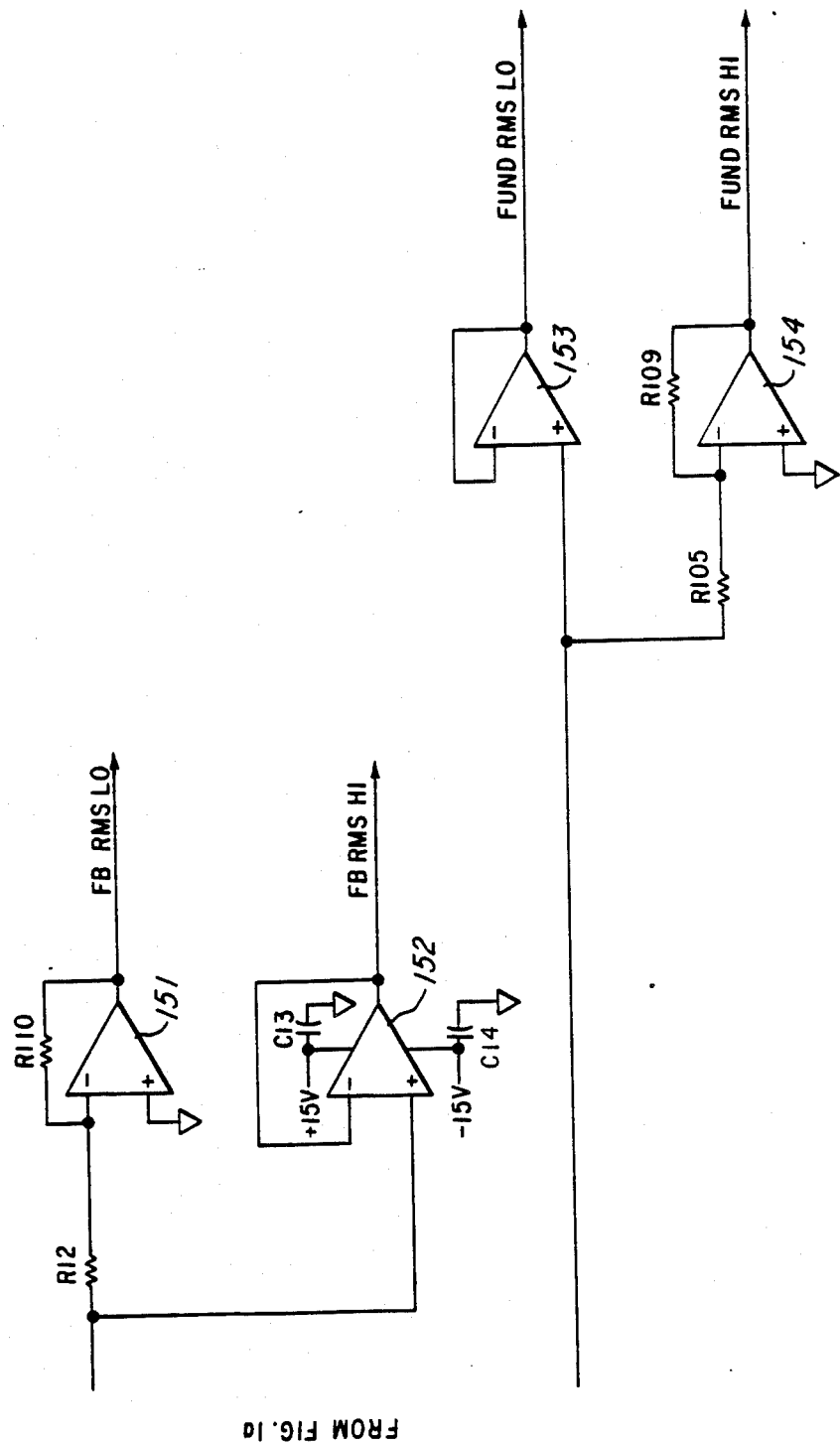

Digital filters 143 and 144 could also be implemented, as is well known, in the digital computer. FIGS. 9a and 9b show the FB HETERODYNED signal from terminal T19 (which is the fundamental signal) applied through capacitor C4 to terminal VIN of RMS converter 73. Signal FB SSB from terminal T20 is shown impressed, through capacitor C3, on terminal VIN of RMS converter 69. Circuits for signals FB SSB and the fundamental are identical and the circuitry for signal FB SSB shall be described. The OUT terminal of unit 69 provides an input to the positive terminal of amplifier 152, and through resistor R12 to the negative terminal of amplifier 151. The output of amplifier 151 is signal FB RMS LO and the output of amplifier 152 is signal FB RMS HI. In exactly the same signal development. signal FUND RMS LO is output from amplifier 153. Amplifier 154 provides output signal FUND RMS HI. These signals, as mentioned earlier, are double ended because of an exit transmission requirement and are brought together in the digital computer component amplitude compensator 75.

Figure 10A:
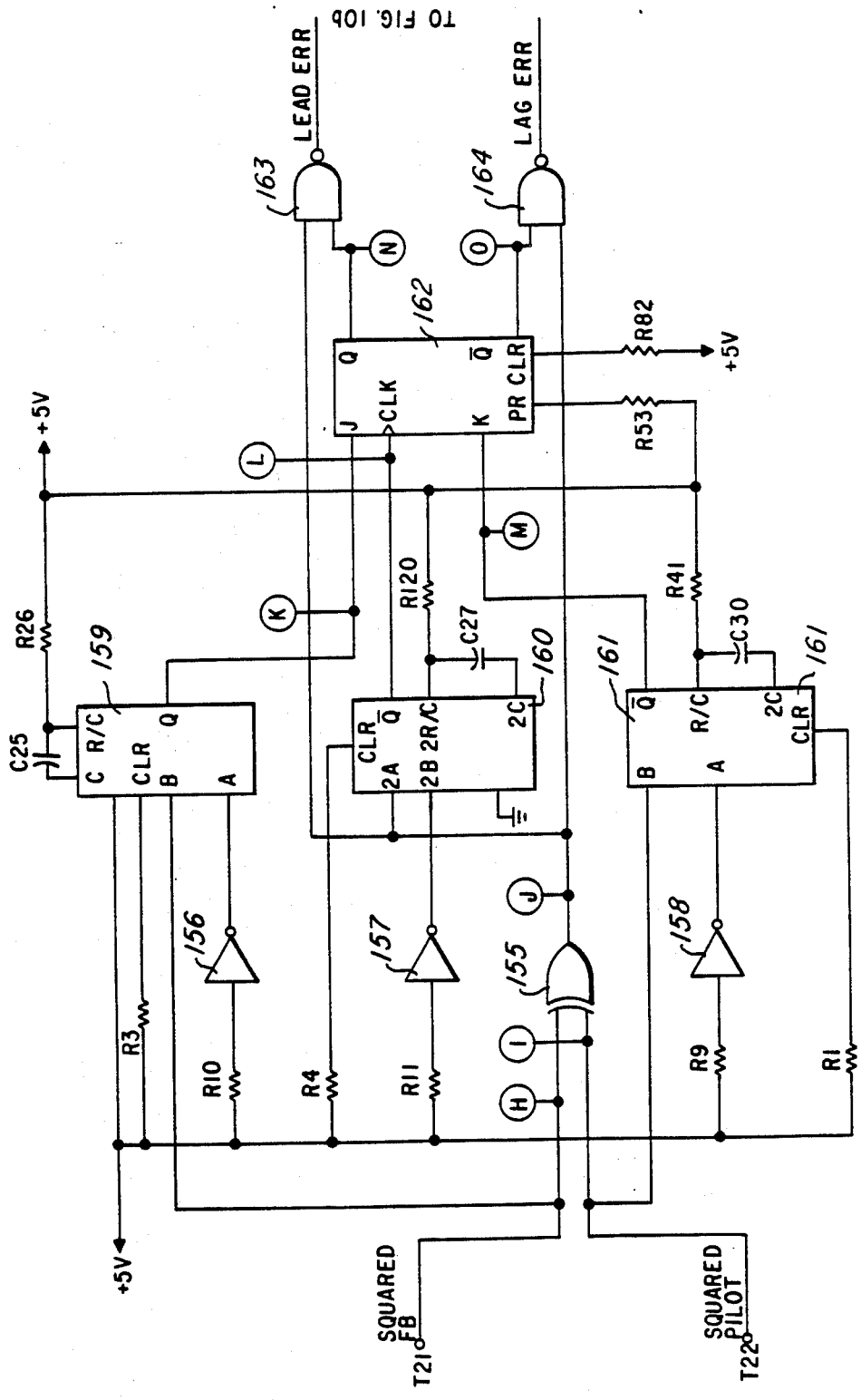
FIGS. 10a and 10b together schematically illustrate the phase detector of this invention.
Figure 10B:
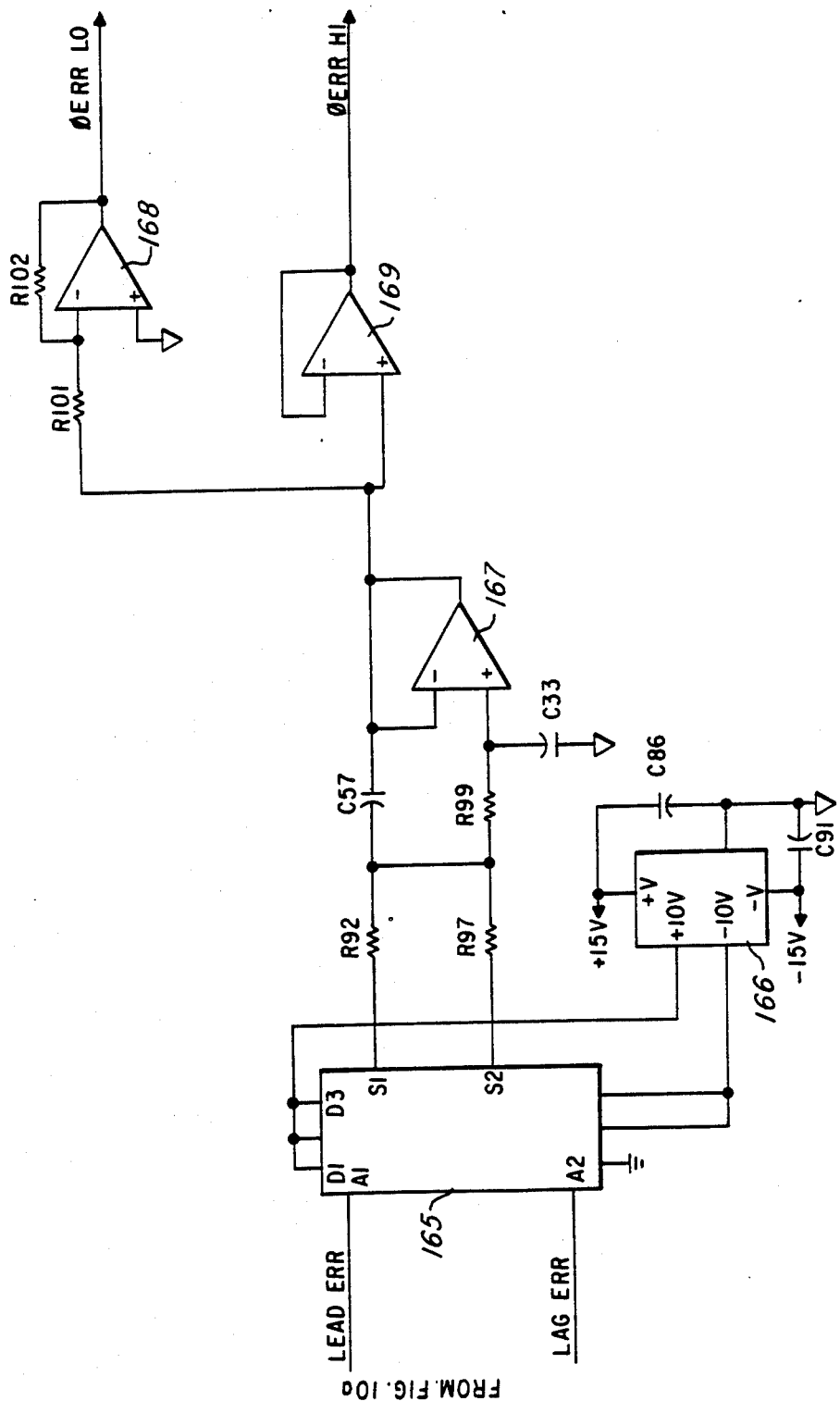

FIG. 10a is a schematic diagram of a prior art phase detector circuit, with input signals squared FB and squared PILOT. No detailed description is required but waveforms will be discussed in connection with the mode of operation. Suffice it to say at this point that NAND gate 163 provides output signal LEAD ERR and NAND gate 164 provides signal LAG ERR. These signals are input to terminals A1 and A2, respectively, of analog switch 165, a type AD7511DIDT/883B from Analog Devices. Terminal S1 or terminal S2 will provide an output, depending upon whether it is LEAD ERR or LAG ERR to drive amplifier 167. Amplifier 167 in turn drives amplifiers 168 and 169 to provide a doubled ended output signal for ERROR LO and ERROR HI. These signals are applied to the phase compensator 81 of the digital computer.

Figure 13:
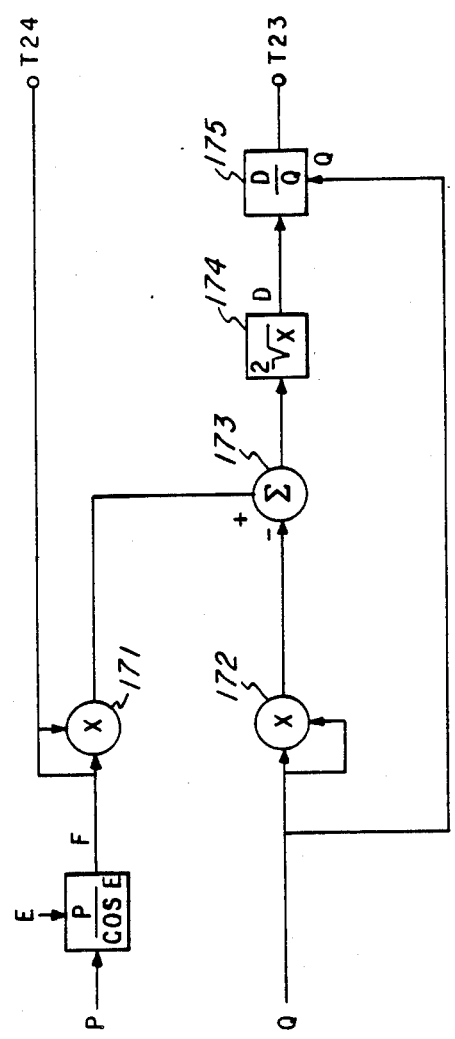
FIG. 13 schematically illustrates the digital development of the total harmonic ditortion percentile.

Turning now to FIG. 13, the digitized product signal is shown as "P" and the digitized distortion signal is shown as "Q". The digitized phase difference signal is shown as "E". Signal P is divided by the cosine of the phase difference signal "E" to produce "F", a representation of the RMS amplitude of the fundamental signal. Signal F is squared at multiplier 171 and signal D is squared at multiplier 172. The sum of these squares is taken at summation 173 and the square root is taken at 174 to provide, at 175, the ratio of the distortion to the total signal RMS amplitude shown as D/Q at terminal T23. A digital fundamental signal Q is provided at terminal T24.

Figure 14:
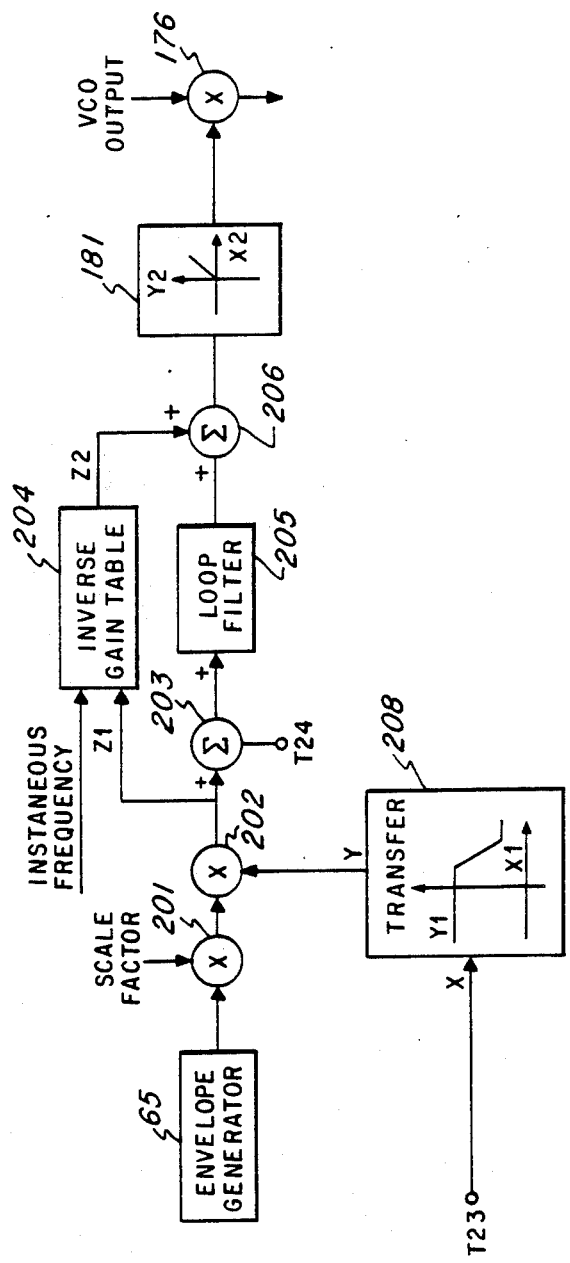
FIG. 14 illustrates the digital development of the control signal.

FIG. 14 illustrates envelope generator 65 providing a pilot signal input to multiplier 201. Another input multiplier to 201 is "SCALE FACTOR". The SCALE FACTOR is provided by the microcomputer. The SCALE FACTOR is 1 unless the real time harmonic distorton exceeds a settable threshold for a period of time. In this preferred embodiment, the threshold is set at 20% of the feedback signal and if after four successive sweeps that threshold is exceeded, then the scale factor is reduced for subsequent sweeps. In this preferred embodiment, the maximum value for the scale factor is 1 and the minimum is 0.5.

Transfer block 208 is shown receiving the real time harmonic distortion on terminal T23. Its output to multiplier 202 is determined by the amplitude of the distortion on terminal T23. If the real time distortion is below a particular threshold, the output of block 208 is simply 1, to ignore that real time distortion. As the distortion becomes larger, then the output becomes less than 1. In this preferred embodiment, if the distortion on terminal T23 is less than 0.2, then the output is 1; if the distortion is greater than 0.2 and less than 0.4, the output is determined by the equation $Y = 1.50 - 2.50X$; if the distortion is greater than or equal to 0.4, then the output is equal to 0.5.

Multiplier 202 multiplies the output of block 208 with the output from multiplier 201 to further reduce the pilot signal envelope which is applied as an input to the inverse gain table 204. Inverse gain table 204 is formed in the memory of the microcomputer. The instantaneous frequency input is provided by the microcomputer and is a signal typically used in an exploration system, being used for other functions as well. Inverse gain table 204 stores the ratio of the control signal (the output of summer 206) to the fundamental signal (on terminal T24) at addresses which correspond to discrete frequencies. In this preferred embodiment, these frequencies are at 1 Hertz steps. The instantaneous frequency provided does not necessarily correspond to 1 Hertz steps and is used for addressing the table. Therefore, an interpolation is made to provide the ratio for multiplication by signal Z1, the output from multiplier 202, which represents the reduced pilot signal envelope. The output from table 204 is signal Z2, the product of the multiplication, a distortion tread signal. In this preferred embodiment, after each sweep, the table is updated by averaging the Z2 signal with the ratio previously stored in the table. Other weighting schemes could, of course, be employed.

The fundamental signal on terminal T24 is substracted from the reduced pilot signal envelope from multiplier 202 to provide an error signal into loop filter 205. In this preferred embodiment, loop filter 205 is a digital integrator whose output provides an input to summer 206 whose other input is provided by signal Z2. The output from summer 206 is limited through limiter 181 to prevent any negative output. At multiplier 176, the output from limiter 181 is multiplied with the VCO output from analog wave synthesizer 77 to provide a digital representation of the control signal which by way of unit 77, is output as an analog signal to the power amplifier 57 shown in FIG. 2.

MODE OF OPERATION

For this discussion, please refer continually to FIG. 2, as well as to those figures specifically referenced.

Referring to FIG. 2, the output signals from accelerometers 53 and 56 are summed in summation amplifier 62 and then selected by switch 63 as to mass accelerometer 53, pad accelerometer 56, or the weighted sum of the two (useful for approximating the signal force) from amplifier 62. The selected signal is the feedback signal which is single sideband shifted by unit 68 and output to RMS converter 69 and multiplier 72. The RMS value of the distortion signal is provided out of RMS converter 69 and the product signal value is provided out of low pass filter 73. These signals are digitized in A to D converters 71 and 74, respectively, and sent to the amplitude compensator 75.

Figure 6A:
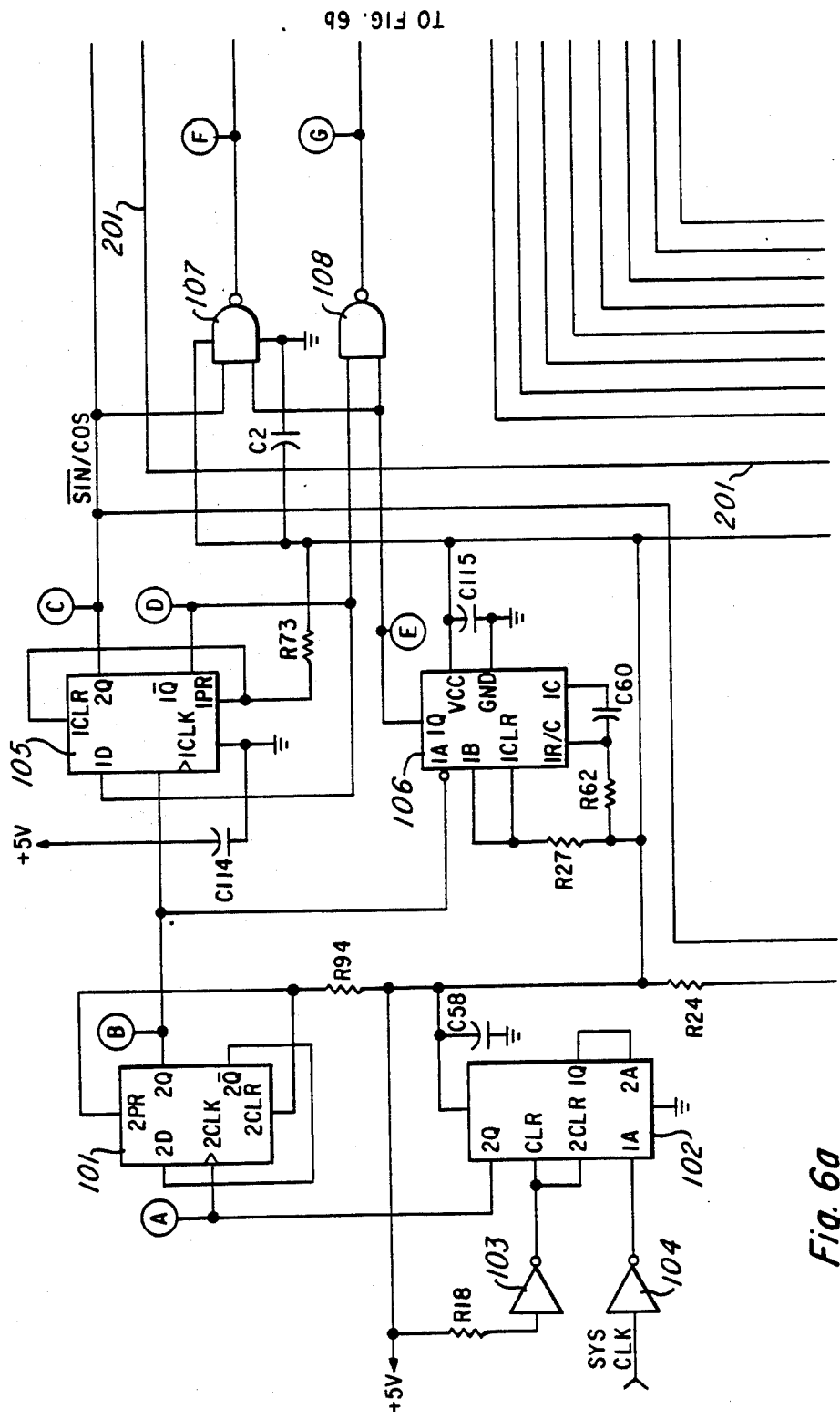
FIGS. 6a–6d joined as shown illustrate another section of the single sideband shifting network.
Figure 6B:
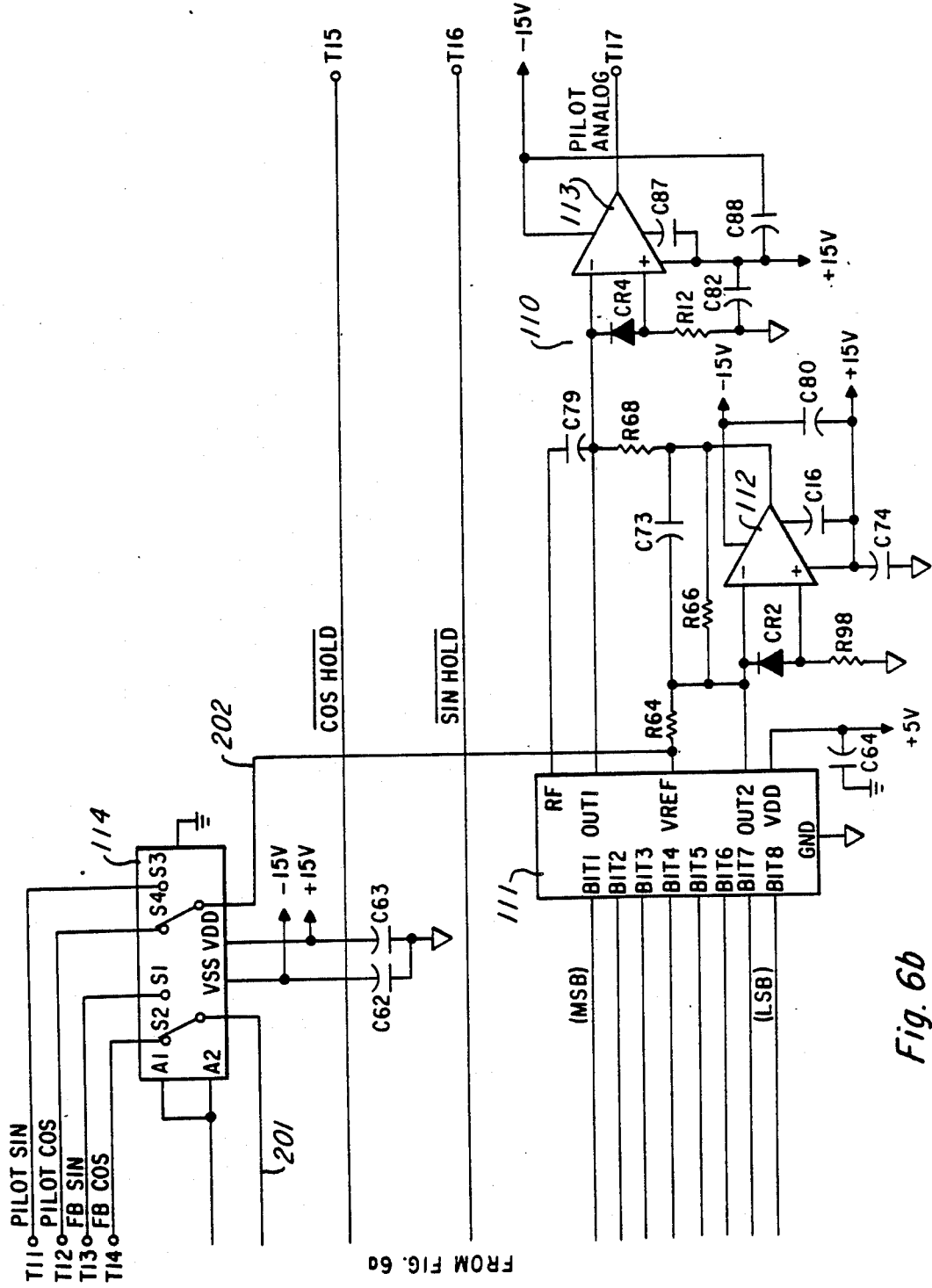
Figure 11:
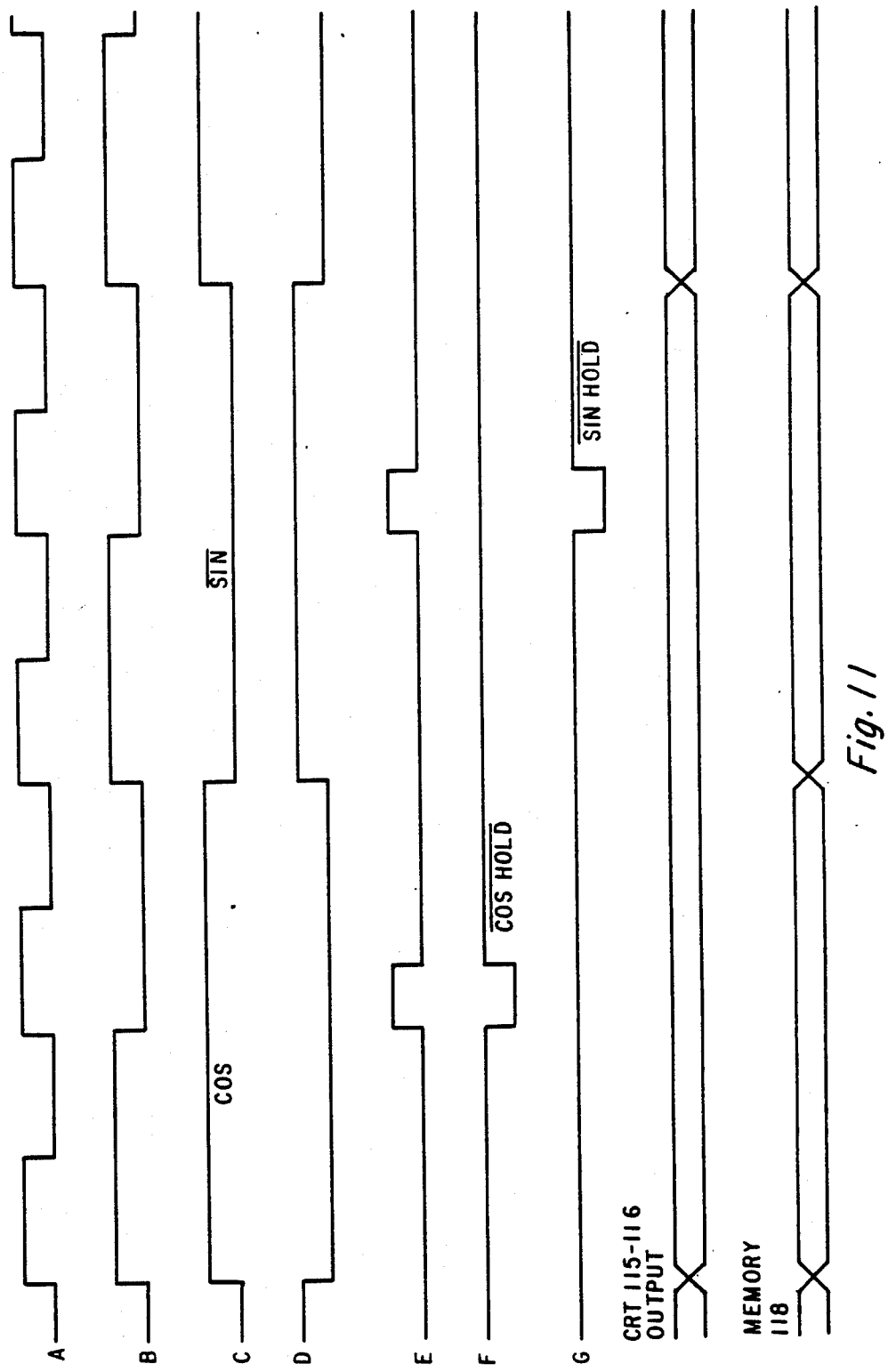
FIG. 11 illustrates waveforms relating to the timing of a single sideband shifting network.

Referring now to FIG. 6a, please note that signals A–G are shown at selected points. FIG. 11 shows the various waveforms at those points. Signal A is shown as a square wave for clocking flip-flop 101. Signal B, the output of flip flop 101, as expected, is at one half the frequency of signal A. Signal C, the output from flip flop 105, is again halved in frequency to provide output signal SIN-/COS. Signal D is the inverse of signal C. The output of one shot 106 is signal E. The output of NAND gate 107 is signal F and the output from NAND gate 108 is signal G. Signal F is COS HOLD- and signal G is SIN HOLD- which are used for gating the sample and hold circuits described earlier.

Figure 6C:
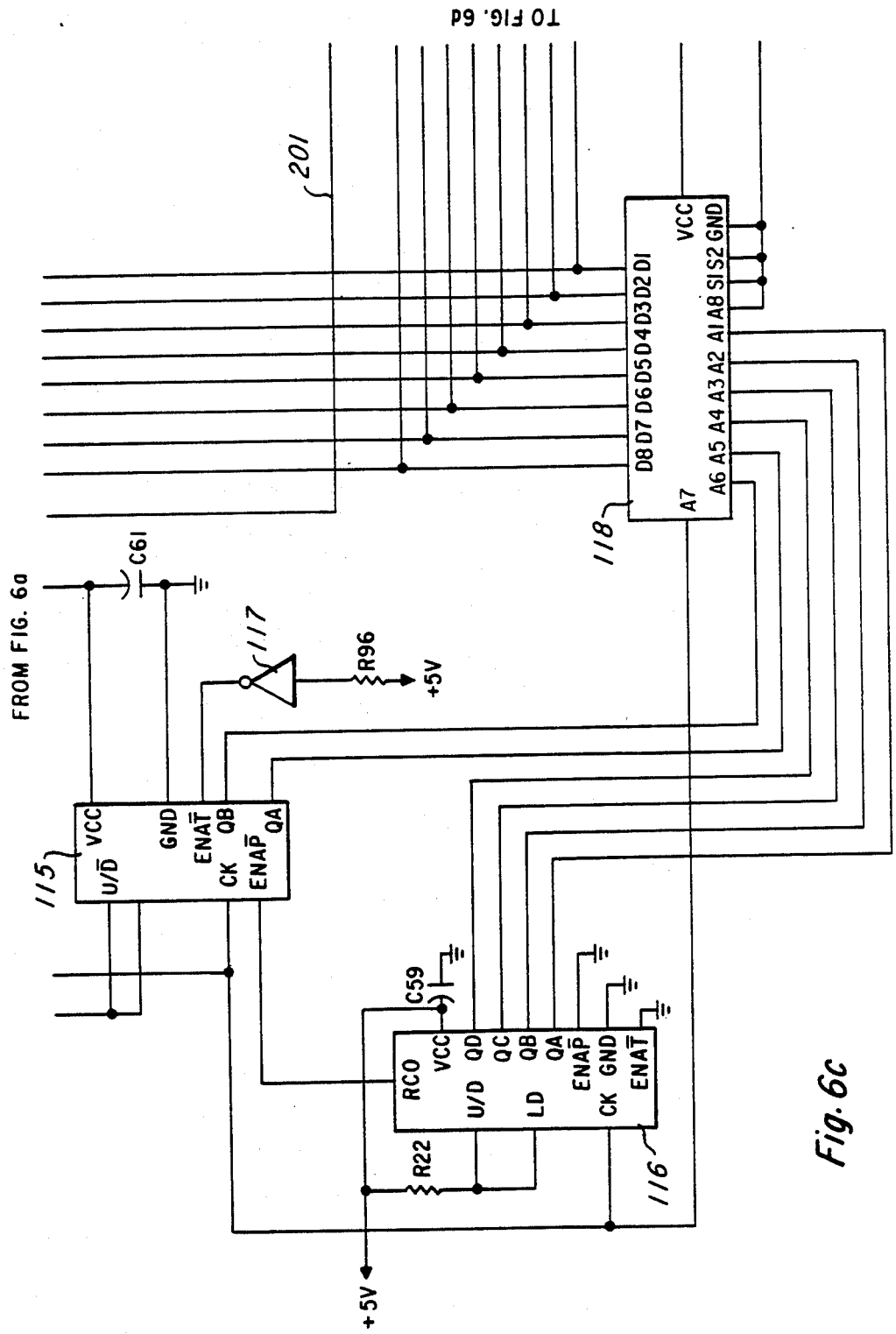
Figure 6D:
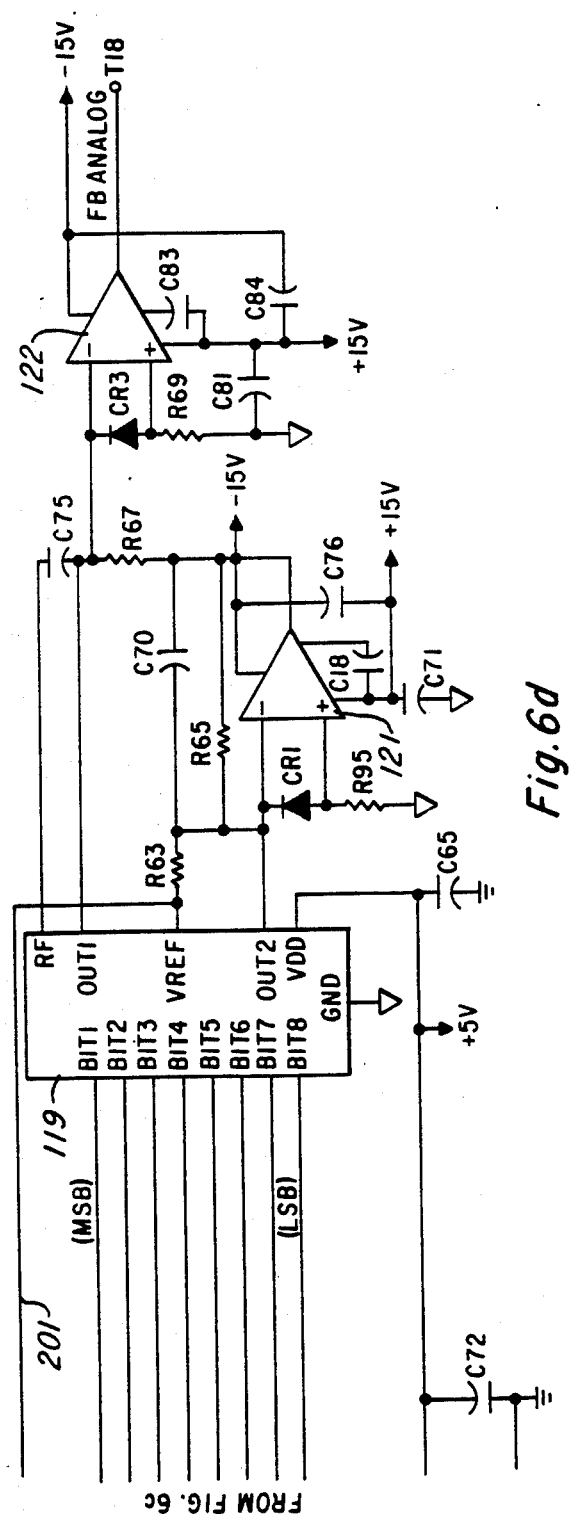

The outputs from counters 115–116 of FIG. 6c are shown and the outputs from memory 118 are shown (as either sine or cosine). These signals then illustrate the operation of the timing for the single sideband shift network.

Figure 12:
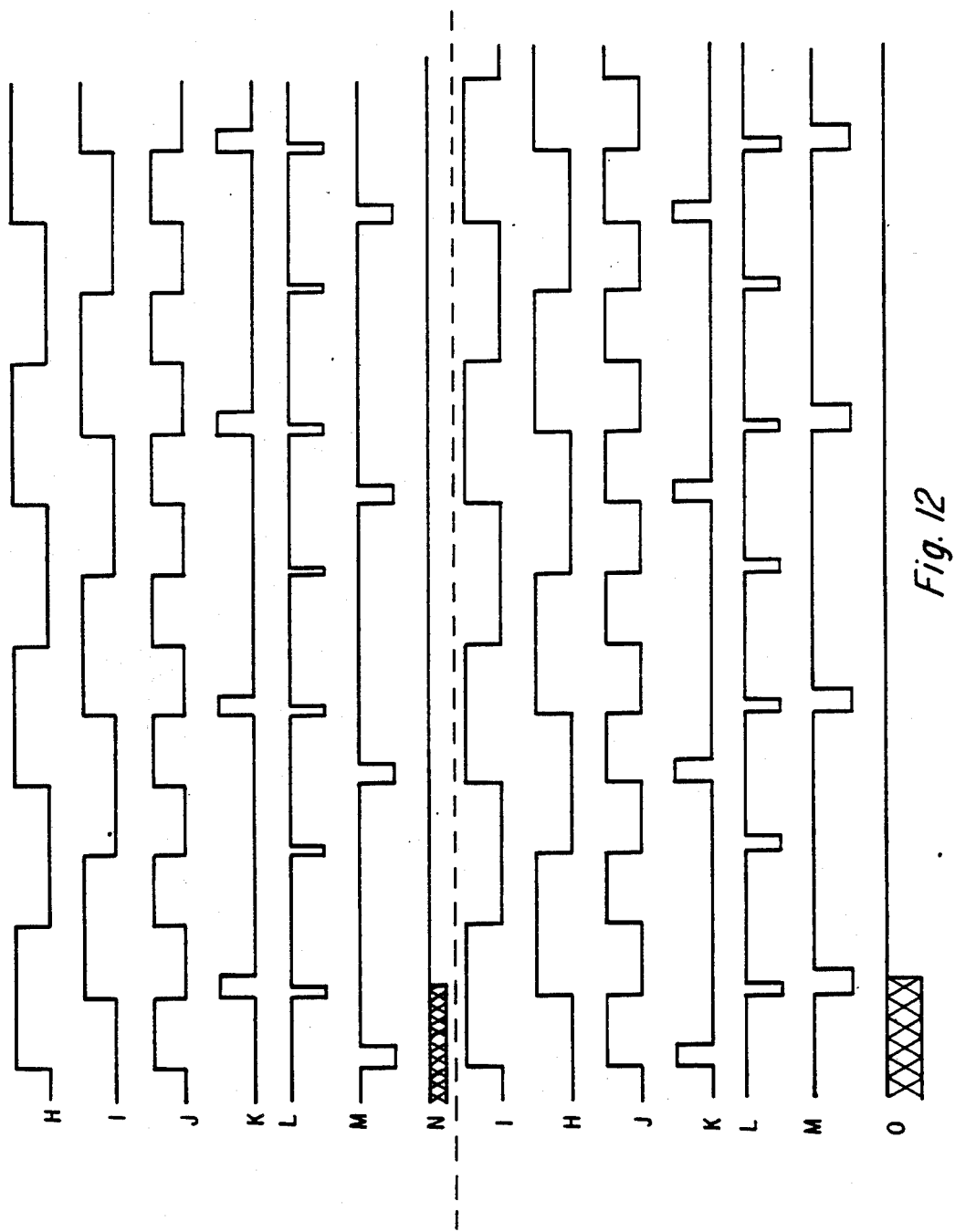
FIG. 12 illustrates timing signals involved in the phase detector.

Refer now to FIGS. 10a and 12 where various signals are shown in the prior art phase detector. Signals H–N on the upper half of the drawing illustrate a LEAD ERR while the lower signals I, H, J, K, L, M, and O illustrate the LAG ERR situation. Signal H is the squared FB and signal I is the squared PILOT signal. The output of exclusive OR gate 155 is represented by signal J which is twice the frequency of signals H or I and is triggered by the leading one of those two signals. Signal K is the output from one shot 159 and signal L is the clock input to flip flop 162. Note the difference in time occurrence between signal K above and signal K below. Signal M is the output one shot 221 and the K input to flip flop 162. Q and Q- outputs from flip flop 122 are signals N and O. Note that signals N and O are the inverse of each other, as would be expected to signify a LEAD or LAG error.

Figure 15C:
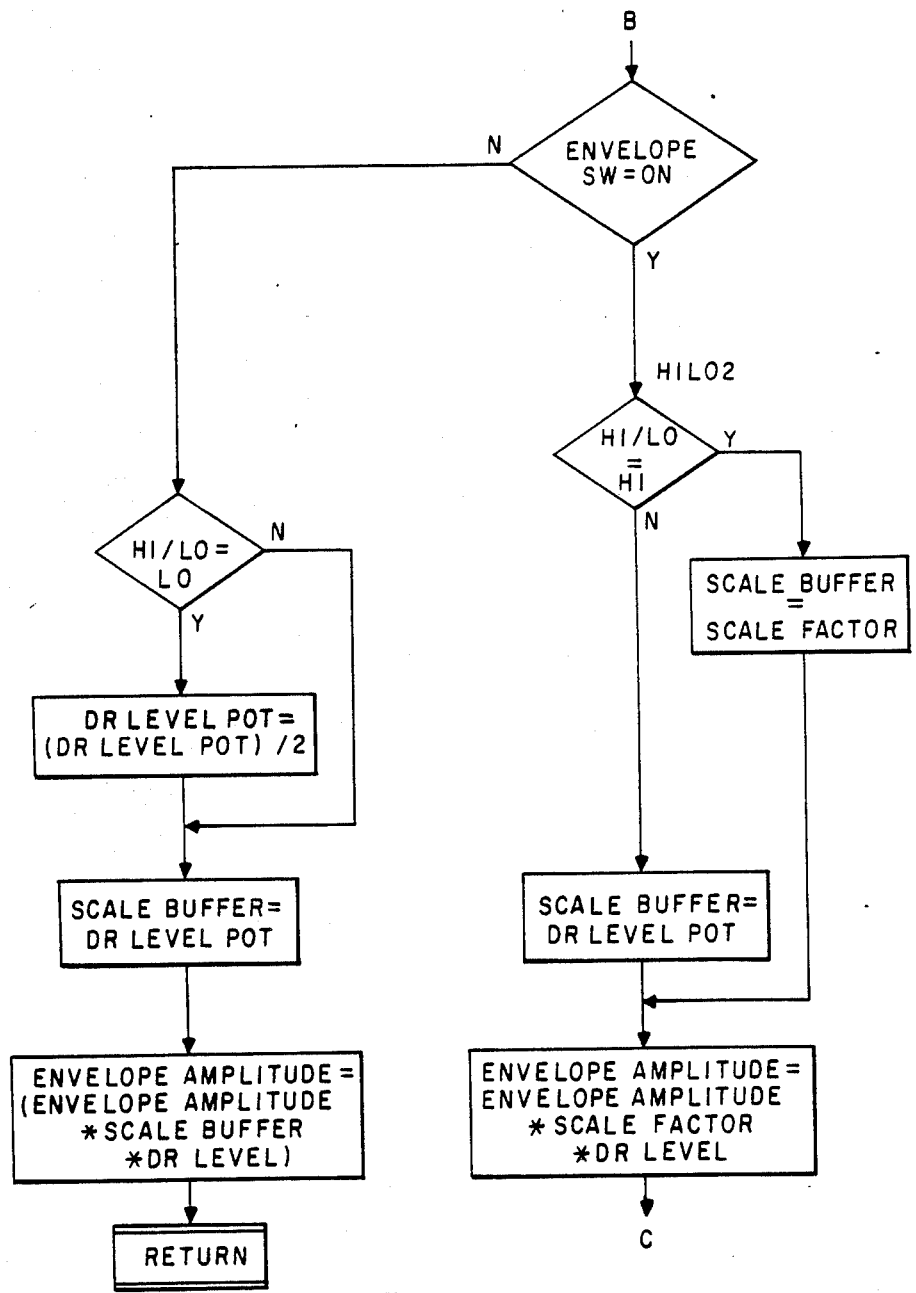
FIGS. 15a and 15d form a flow chart describing the digital amplitude correction.

FIGS. 15a–15f illustrate the operation of the amplitude compensator 75 of FIG. 2. Please note that Table 1 is the computer program that makes up this flowchart illustrated in FIGS. 15a–15f. The various components of the flowchart are clearly set out in Table 1 which details the flow chart symbols. Referring to FIGS. 15a and 15b, the total harmonic distortion is calculated and there is an output to the meter as shown in FIG. 2 from amplitude compensator 75. A determination is made as to whether the envelope switch is on and if not, a determination is made as to whether the HI/LO switch is on and if so, the drive level is divided by 2 and scale buffer equals drive level pot. Next, the envelope amplitude equals the envelope amplitude times the scale buffer times the drive level, as shown in FIG. 15c.

If the envelope switch is on, then the determination is made as to whether HI/LOW equal HI is made. If the answer is no, then the scale buffer equals the drive level pot, and if yes, the scale buffer equals the scale factor. Then the envelope amplitude equals envelope amplitude times scale factor times drive level.

In FIG. 15d, it is shown that a calculation of distortion compensation is made and then the drive level is set equal to the distortion compensation times the drive level. Next, the drive level equals the drive level minus the fundamental peak. Then drive level equals drive level times integral gain and finally the drive integral equals drive integral plus drive level, as set out in FIG. 15d.

Figure 15E:
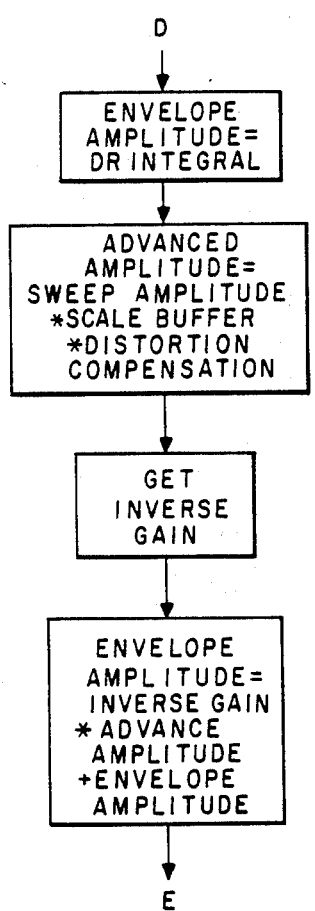

In FIG. 15e, the envelope amplitude equals the drive integral and then the advanced amplitude equals sweep amplitude times scale buffer times distortion compensation. Next, the inverse gain is obtained and the envelope amplitude is made to equal the inverse gain time the advanced amplitude plus the envelope amplitude.

Figure 15F:
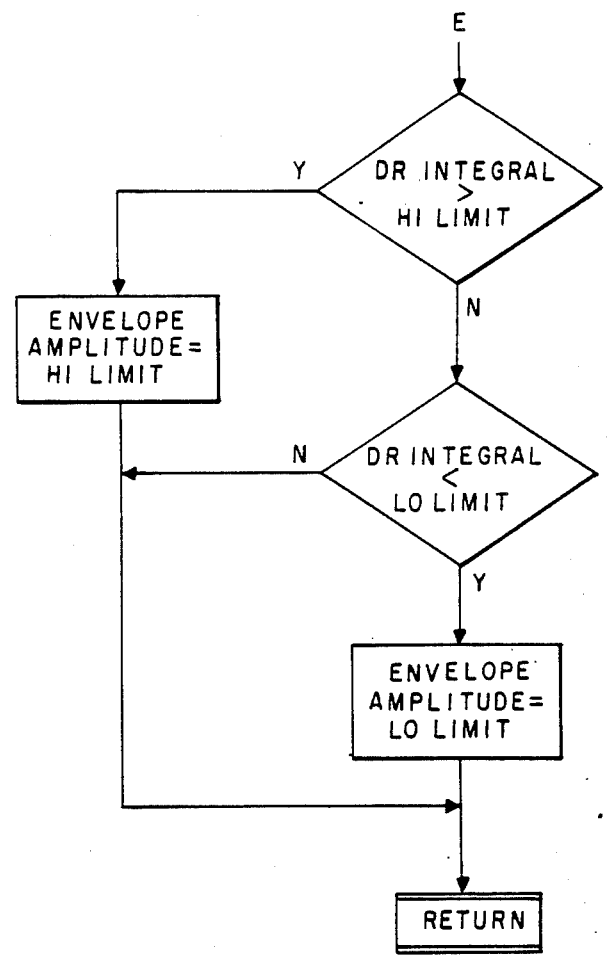

In FIG. 15f, it is determined whether the drive integral is greater than the HI LIMIT, and if it is, then the envelope amplitude equals HI LIMIT and the routine is complete. If not, then it is determined whether the integral is less than the LO LIMIT and if not, the routine is completed. If the answer is yes, then the envelope amplitude equals a low limit and the routine is completed.

Figure 16A:
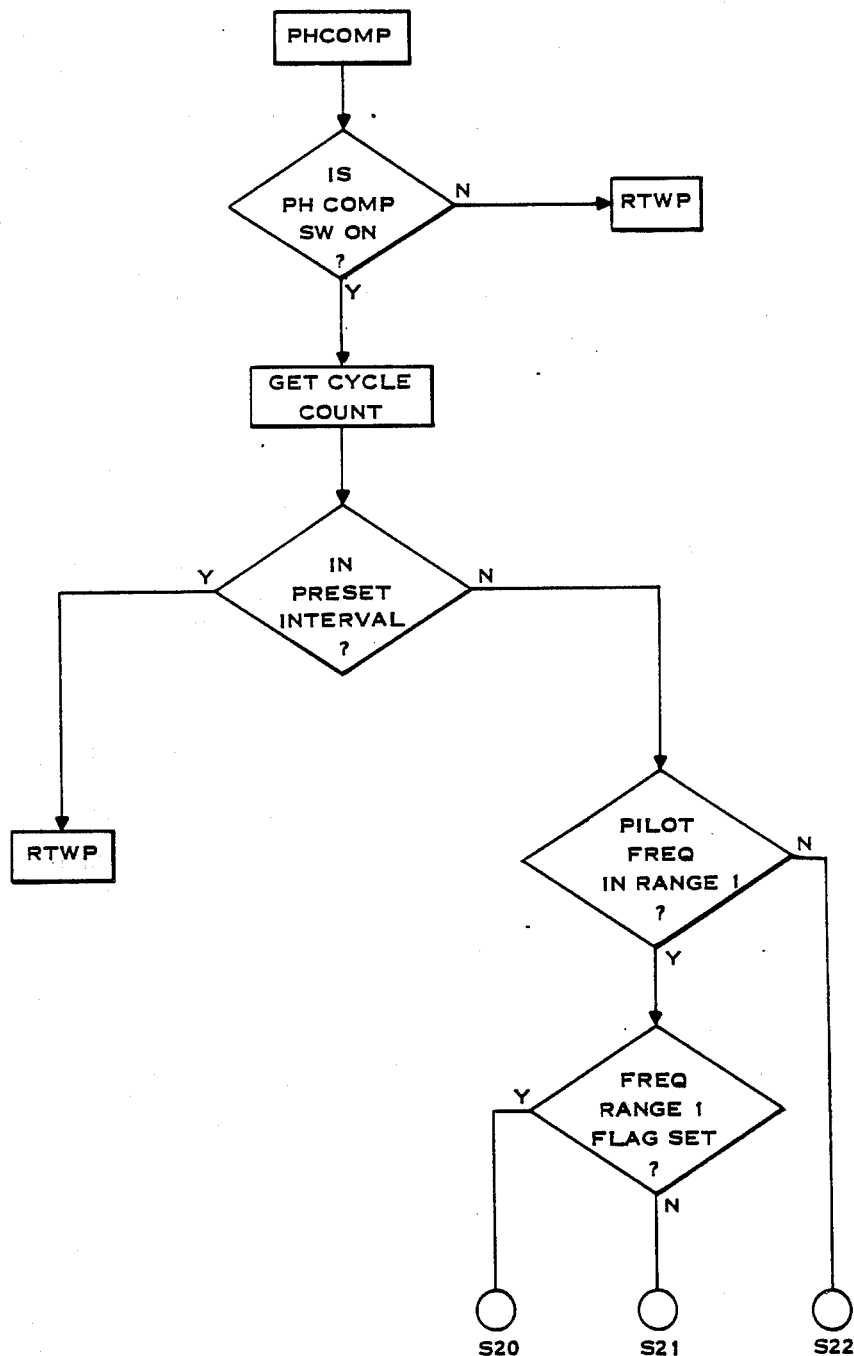
FIGS. 16a–16c form a flow chart describing the digital phase compensation.
Figure 16B:
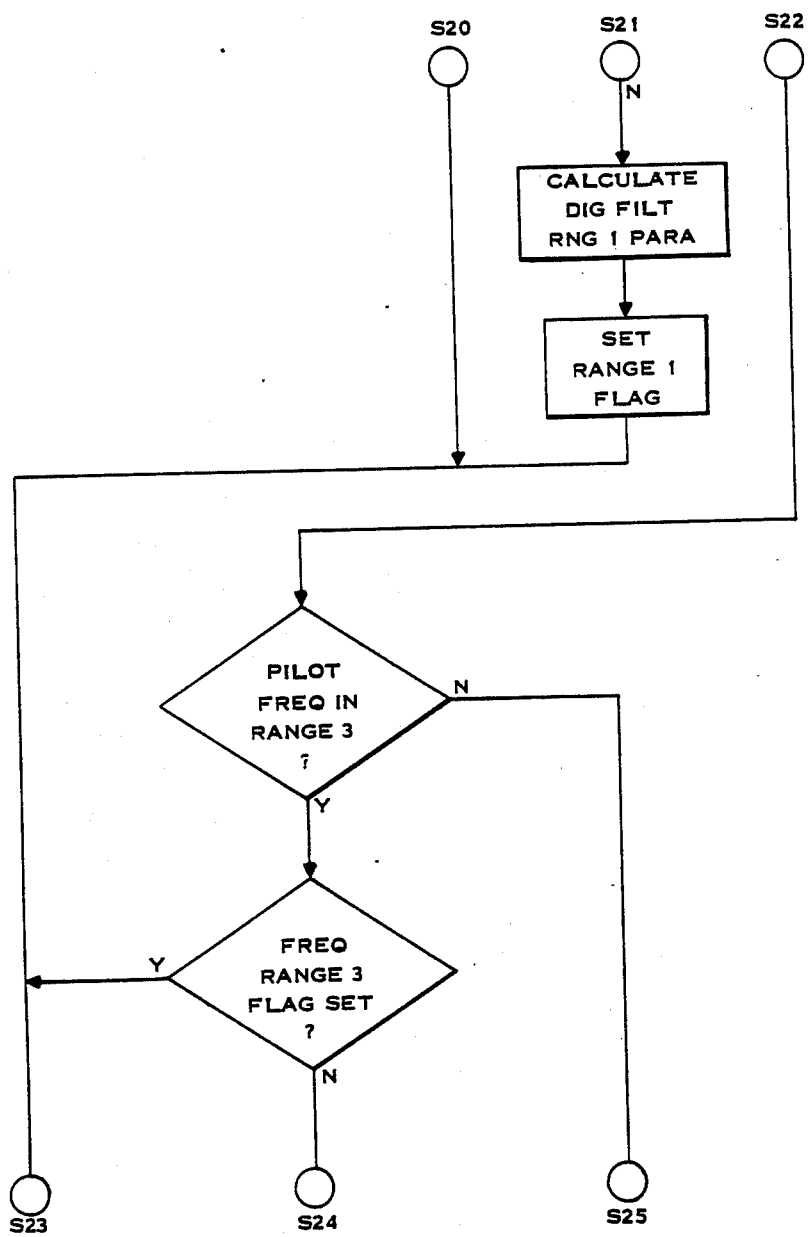
Figure 16C:
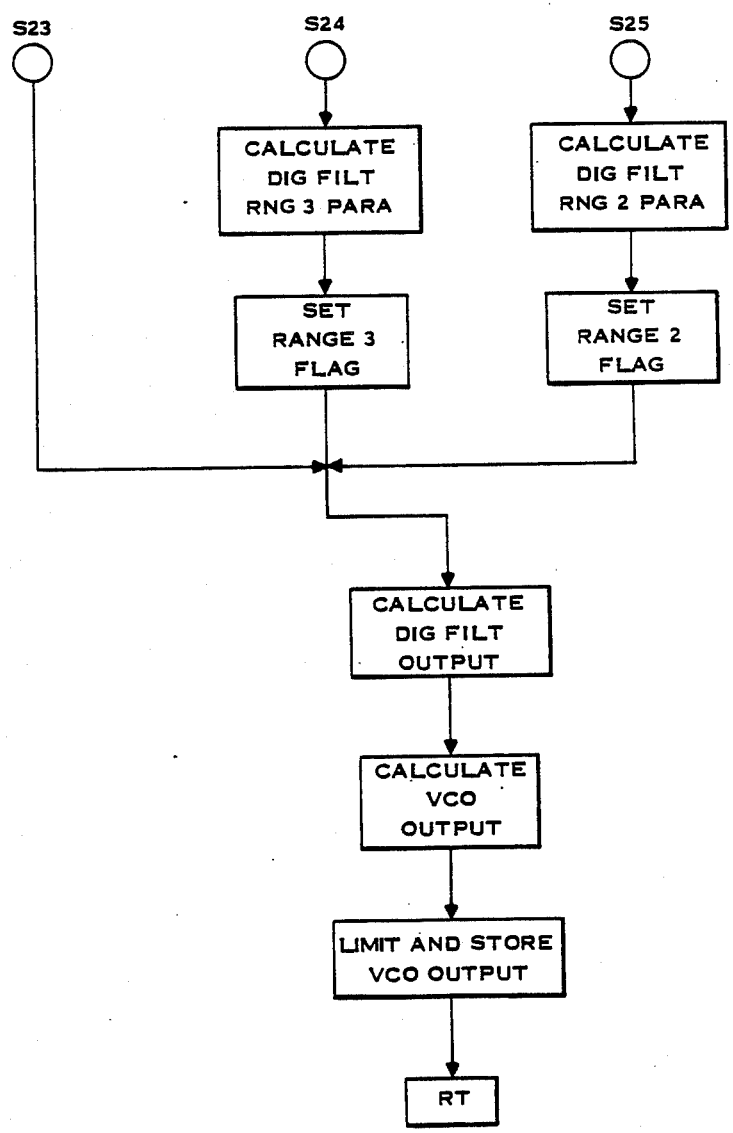

FIGS. 16a–16c form a flowchart illustrating control of the phase compensation performed in phase compensator 81 of FIG. 2. It should be noted that the details of the decision blocks of the flowchart on FIG. 16a–16c are shown in the program listing of Table II. For minute detail of these blocks, please refer to Table II.

On FIG. 16a, the question "Is phase compensation switch on?" is asked. If the anser no, there will be no phase compensation. If the answer is yes, the cycle count is obtained and it is determined whether this is within the present interval. If the answer is yes, the routine is exited. If the answer is no, it is determined whether the pilot frequency is in range 1. If the answer is yes, it is determined whether the frequency range 1 flag is set. If the answer is yes, then the routine shown in FIG. 16b is skipped and an entry is made to the block that refers to calculate digital filter output.

If the answer was no with respect to when the pilot frequency was in range 1, then a decision is made whether the pilot frequency is in range 3. If it was determined that the frequency range 1 flag was set, then the digital filter for range 1 is calculated and the range 1 flag is set.

If the pilot frequency is in range 3, then it is determined whether the frequency range 3 flag is set. If the pilot frequency is not in range 3, then the digital filter for range 2 is calculated and the range 2 flag is set. If the frequency range 3 flag is not set, then the digital filter for range 3 is set and the range 3 flag is set. For all active cases then, the next step is to calculate the digital filter output and then to calculate the VCO output (see FIG. 14). Next, the VCO output is limited and stored and the routine is exited.

In this manner, the phase compensation is accomplished.

The component types shown in this preferred embodiment and the particular circuit or filter configurations are not be be construed as limiting. It is understood that those skilled in the art are capable of changing configurations, parameter limits and timing and it is intended that this specific implementation not be limiting, but that the invention be limited only by the appended claims.

What is claimed is:

1. A vibrator seismic source, having a power amplifier and providing instantaneous frequency signals, comprising:
   (a) a pad for imparting elastic waves to the underlying ground;
   (b) hydraulic system means, including a mass, responsive to the power amplifier, for applying reciprocating forces to the pad;
   (c) sensor means for sensing and providing a feedback signal, the feedback signal including a first harmonic fundamental signal and harmonic distortion, representative of the force applied to the ground;
   (d) means for generating a desired force to be applied to the ground;
   (e) means for separating the fundamental signal from the feedback signal to provide a fundamental signal;
   (f) means for separating the distortion from the feedback signal to provide a real time distortion signal proportional to the distortion;
   (g) first means for reducing the pilot signal amplitude as determined by the real time distortion signal;
   (h) scale factor means, receptive to the real time distortion signal, providing a signal of unity for a real time distortion signal of zero, and a less than unity signal when the real time distortion signal reaches a predetermined threshold;
   (j) second means for reducing the amplitude of the pilot signal as determined by the scale factor means; and
   (k) means for generating a control signal, including means for generating an error signal between the fundamental signal and the reduced amplitude pilot signal, means for generating a distortion trend signal, and means for combining the error signal with the distortion trend signal to produce the control signal for application to the power amplifier.

2. The seismic source of claim 1 wherein the sensor means comprises:
   (c)
   (i) a sensor mounted on the mass to measure mass acceleration;
   (ii) a sensor mounted on the pad to measure pad acceleration; and
   (iii) sensor summing means for summing the mass acceleration and the pad acceleration to provide the feedback signal.

3. The seismic source of claim 2 wherein the sensor means further comprises switch means for selecting the output of the sensor summing means, the mass acceleration or the pad acceleration as the feedback signal.

4. The seismic source of claim 1 wherein the means for generating a pilot signal comprises sweep generator means for providing a spectrum of frequencies within a predetermined range, including envelope control means for selectively controlling the contour of the envelope defining the amplitude of the pilot signal.

5. The seismic source of claim 1 wherein the means for separating the fundamental signal from the feedback signal comprises means for multiplying the pilot signal with the feedback signal.

6. The seismic source of claim 1 wherein the means for separating the distortion from the feedback signal comprises:
   (f)
   (i) means for converting the feedback signal into a first digital signal representative of the RMS value of the distortion component of the feedback signal;
   (ii) means for converting the fundamental signal into a second digital signal representative of the RMS value of the fundamental signal;
   (iii) means for squaring each of the first and second digital signals;
   (iv) means for summing the square of the second signal and the first digital signal;
   (v) means for extracting the square root of the sum of the squares; and
   (vi) means for dividing the first signal by the square root signal to provide a third digital signal representative of the ratio of distortion to total RMS content of the feedback signal.

7. The seismic source of claim 6 wherein the means for generating a pilot signal comprises digital computer means for providing a fourth digital signal representative of the pilot signal, and analog wave synthesizing means to convert the fourth signal into the pilot signal.

8. The seismic source of claim 1 wherein the first means for reducing the pilot signal amplitude;
   (g)
   (i) transfer means, connected to receive the real time distortion signal, adapted to transfer a correction signal of unity, at below a predetermined threshold of the real time distortion signal, and to transfer a correction signal of less than unity at at least one additional predetermined higher threshold; and
   (ii) multiplier means for multiplying the correction signal and the pilot signal amplitude as reduced by the second means for reducing the amplitude of the pilot signal.

9. The seismic source of claim 1 wherein the means for generating a control signal comprises:
   (h)
   (i) loop filter means, including input and output combining means, the input combining means for algebraically summing the reduced amplitude pilot signal and the amplitude of the fundamental signal, to provide an error signal and amplifying that error signal; and
   (ii) gain history table means, each table element being located at an address corresponding to a frequency, addressed by the instantaneous frequency signals, and multiplied by the reduced amplitude pilot signal to form a table frequency output to the output combining means for algebraic summation with the amplified sum to provide a control signal for application to the power amplifier.

10. The seismic source of claim 1 wherein the elements of the gain history table means represent the inverse gain calculated as the ratio of the amplitude of the control signal to the amplitude of the fundamental signal.

11. The seismic source of claim 10 wherein instantaneous frequency signals are of a frequency different from the addresses of the elements.

12. The seismic source of claim 11 further including means for interpolating between table elements in correspondence with an instantaneous frequency signal.

13. The seismic source of claim 12 further including means for averaging the addressed element with at least one resultant inverse gain and replacing the addressed element with the averaged inverse gain.

14. The seismic source of claim 9 further comprising:
(k) phase detector means for detecting a difference in phase between the pilot and feedback signal; and
(l) phase correction means for shifting the feedback signal into phase with the pilot signal.

15. The seismic source of claim 14 wherein the phase correction means comprises A/D converter means for converting the output of the phase detector means into a sixth digital signal and digital filter means for combining the sixth digital signal with the fourth digital signal.

16. A control system for a vibratory seismic source providing instantaneous frequency signals, for applying a reciprocating force to the underlying ground, the seismic source having a pad for importing elastic waves to the underlying ground, and hydraulic system means, including a mass, for applying reciprocating forces to the pad, the control system comprising:
(a) means for generating a feedback signal, the feedback signal including a first harmonic fundamental signal and harmonic distortion, representative of the force applied to the ground;
(b) means for generating a distortion-free pilot signal representative of the desired force to be applied to the ground;
(c) means for separating the fundamental signal from the feedback signal to provide a fundamental signal;
(d) means for separating the distortion from the feedback signal to provide a real time distortion signal proportional to the distortion;
(e) first means for reducing the pilot signal amplitude as determined by the real time distortion signal;
(f) scale factor means, receptive to the real time signal providing a signal of unity for a real time signal of zero, and a less than unity signal when the real time distortion signal reaches a predetermined threshold;
(g) second means for reducing the amplitude of the pilot signal as determined by the scale factor means; and
(h) means for generating a control signal, including means for generating an error signal between the fundamental signal and the reduced amplitude pilot signal means for generating a distortion trend signal, and means for combining the error signal when the distortion trend signal to produce the control signal for application to the power amplifier.

17. The system of claim 16 wherein the means for generating a pilot signal comprises sweep generator means for providing a spectrum of frequencies within a predetermined range including envelope control means for selectively controlling the contour of the envelope defining the amplitude of the pilot signal.

18. The system of claim 17 wherein the means for separating the fundamental signal from the feedback signal comprises means for multiplying the pilot signal with the feedback signal.

19. The system of claim 18 wherein the means for separating the distortion from the feedback signal comprises:
(d)
(i) means for converting the feedback signal into a first digital signal representative of the RMS value of the distortion component of the feedback signal;
(ii) means for converting the fundamental signal into a second digital signal representative of the RMS value of the fundamental signal;
(iii) means for squaring each of the first and second digital signals;
(iv) means for summing the square of the first digital signal from the square of the second digital signal;
(v) means for extracting the square root of the sum of the squares;
(vi) means for dividing the first signal by the square root digital signal to provide a third digital signal representative of the distortion ratio signal.

20. The system of claim 19 wherein the means for generating a pilot signal comprises digital computer means for providing a fourth digital signal representative of the pilot signal, and analog wave synthesizing means to convert the fourth signal into the pilot signal.

21. The system of claim 16 wherein the first means for reducing the pilot signal amplitude comprises:
(e)
(i) transfer means, connected to receive the real time distortion signal, adapted to transfer a correction signal of unity below a predetermined threshold of the real time distortion signal, and to transfer a correction signal of less than unity at at least one additional predetermined higher threshold; and
(ii) multiplier means for multiplying the correction signal and the pilot signal amplitude as reduced by the second means for reducing the amplitude of the pilot signal.

22. The system of claim 16 wherein the means for generating a control signal comprises:
(h)
(i) loop filter means, including input and output combining means, the input combining means for algebraically summing the reduced amplitude pilot signal and the amplitude of the fundamental signal to provide an error signal and amplifying that error signal; and
(ii) gain history table means, each table element being located at an address corresponding to a frequency, addressed by the instantaneous frequency signals, and multiplied by the reduced amplitude pilot signal to form a table frequency output to the output combining means for algebraic summation with the amplified sum to provide a control signal for application to the power amplifier.

23. The system of claim 22 wherein the elements of the gain history table means represent the inverse gain calculated as the ratio of the amplitude of the control signal and the amplitude of the fundamental signal.

24. The system of claim 23 wherein the instantaneous frequency signals are of a frequency different from the addresses of the elements.

25. The system of claim 24 wherein the instantaneous frequency signals are of a frequency different from the addresses of the elements.

26. The system of claim 25 further including means for interpolating between table elements in correspondence with an instantaneous frequency signal.

27. The system of claim 16 further comprising:
(g) phase detector means for detecting a difference in phase between the pilot and feedback signal; and
(h) phase correction means for shifting the feedback signal into phase with the pilot signal.

28. The system of claim 27 wherein the phase correction means comprises A/D converter means for converting the output of the phase detector means into a sixth digital signal and digital filter means for combining the sixth digital signal with the fourth digital signal.

29. A method of controlling the operation of a variable frequency vibratory seismic source for impating reciprocating forces to the ground, and providing instantaneous frequency signals, the source including a power amplifier, a pad for imparting elastic waves to the underlying ground, and hydraulic system means, including a mass, responsive to the power amplifier for applying reciprocating force to the pad, comprising the steps of:

(a) providing a feedback signal representative of the ground force, including a fundamental signal and distortion:
(b) providing a pilot signal representative of the desired ground force;
(c) separating the fundamental signal from the feedback signal;
(d) separating the distortion from the feedback signal;
(e) reducing the amplitude of the pilot signal a designated amount as determined by the distortion;
(f) storing gain history in elements located at discrete addresses in a table, each corresponding to a frequency;
(g) addressing the discrete addresses with the instantaneous frequency signals;
(h) multiplying the addressed gain history element by the reduced amplitude pilot signal to provide a table output;
(i) algebraically summing the amplitude of the fundamental signal with the reduced amplitude pilot signal and amplifying the difference; and
(k) combining the amplified difference with the table output to provide a control signal for application to the power amplifier.

30. The method of claim 29 further comprising the steps of:
(h) detecting a difference in phase between the pilot and feedback signals; and
(i) correcting the phase of the feedback signal to correspond to the pilot signal.

* * * * *